United States Patent
Kobayashi

(10) Patent No.: US 10,871,626 B2
(45) Date of Patent: Dec. 22, 2020

(54) LENS APPARATUS, IMAGE CAPTURING APPARATUS, AND CONTROL METHOD

(71) Applicant: CANON KABUSHIKI KAISHA, Tokyo (JP)

(72) Inventor: Kana Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 16/153,950

(22) Filed: Oct. 8, 2018

(65) Prior Publication Data
US 2019/0113708 A1 Apr. 18, 2019

(30) Foreign Application Priority Data
Oct. 17, 2017 (JP) .................. 2017-201416

(51) Int. Cl.
*G02B 7/04* (2006.01)
*H04N 5/232* (2006.01)
*H04N 5/225* (2006.01)

(52) U.S. Cl.
CPC ............ *G02B 7/04* (2013.01); *H04N 5/2253* (2013.01); *H04N 5/2254* (2013.01); *H04N 5/23209* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 5,231,444 A * | 7/1993 | Watanabe | .............. | G02B 15/08 396/125 |
| 6,046,863 A | 4/2000 | Chino | | |
| 8,390,733 B2 * | 3/2013 | Shintani | ................. | G02B 7/365 348/350 |
| 8,412,034 B2 * | 4/2013 | Okada | .................... | G03B 17/14 396/530 |
| 2005/0158044 A1* | 7/2005 | Ide | ......................... | G03B 17/14 396/71 |
| 2005/0237417 A1* | 10/2005 | Miyasaka | .............. | G02B 15/10 348/335 |
| 2009/0268078 A1* | 10/2009 | Miyazaki | ............. | H04N 5/2254 348/345 |
| 2011/0103789 A1* | 5/2011 | Honjo | .................... | G02B 7/102 396/530 |

* cited by examiner

*Primary Examiner* — James M Hannett
(74) *Attorney, Agent, or Firm* — Canon U.S.A., Inc. IP Divison

(57) ABSTRACT

In a lens apparatus, an interchangeable lens includes an optical system including first and second focus lens units each configured to move in loci different from each other in focusing and a lens control unit configured to control positions of the first and second focus lens units. The lens control unit controls the positions of the first and second focus lens units based on target positions of the first and second focus lens units which are determined according to information about an optical element disposed between the optical system and an image sensor.

13 Claims, 16 Drawing Sheets

LENS APPARATUS, IMAGE CAPTURING APPARATUS, AND CONTROL METHOD

BACKGROUND

Field of the Disclosure

The present disclosure relates to a lens-interchangeable image capturing apparatus and a lens apparatus that can be mounted on the lens-interchangeable image capturing apparatus.

Description of the Related Art

In lens-interchangeable image capturing apparatuses, an optical element (e.g., conversion lens, cover glass for protecting an image sensor) is sometimes disposed between a lens apparatus and an image sensor. Such an optical element can change the focus position and the amount of aberration in an entire system including the optical system of the lens apparatus and the optical element. Specifically, the optical element disposed between the lens apparatus and the image sensor can change the imaging performance in the entire system.

U.S. Pat. No. 6,046,863 discusses an image capturing apparatus including an optical filter configured to be inserted into and removed from an optical axis, and the image capturing apparatus controls the position of a focus lens according to whether the optical filter is present or absent. In this way, defocusing caused by the presence/absence of the optical filter is reduced.

U.S. Pat. No. 6,046,863 is silent on fluctuations in the amount of aberration that are caused by the presence/absence of the optical filter. The technique discussed in U.S. Pat. No. 6,046,863 controls only one focus lens, so that there is an issue that it is difficult to reduce both fluctuations in the amount of aberration and defocusing caused by the presence/absence of the optical element such as the optical filter.

SUMMARY

According to an aspect of the present invention, a lens apparatus mountable on and removable from an image capturing apparatus including an image sensor, the lens apparatus includes an optical system including a first focus lens unit and a second focus lens unit each being configured to move in loci different from each other in focusing, and a lens control unit configured to control a position of the first focus lens unit and a position of the second focus lens unit, wherein the lens control unit controls the position of the first focus lens unit and the position of the second focus lens unit based on the loci of the first focus lens unit and the second focus lens unit, the loci of the first focus lens unit and the second focus lens unit being determined according to information about an optical element disposed between the optical system and the image sensor.

Further features of the present invention will become apparent from the following description of exemplary embodiments with reference to the attached drawings.

DESCRIPTION OF THE EMBODIMENTS

Various exemplary embodiments of the invention will be described below with reference to the attached drawings.

Figure 1:
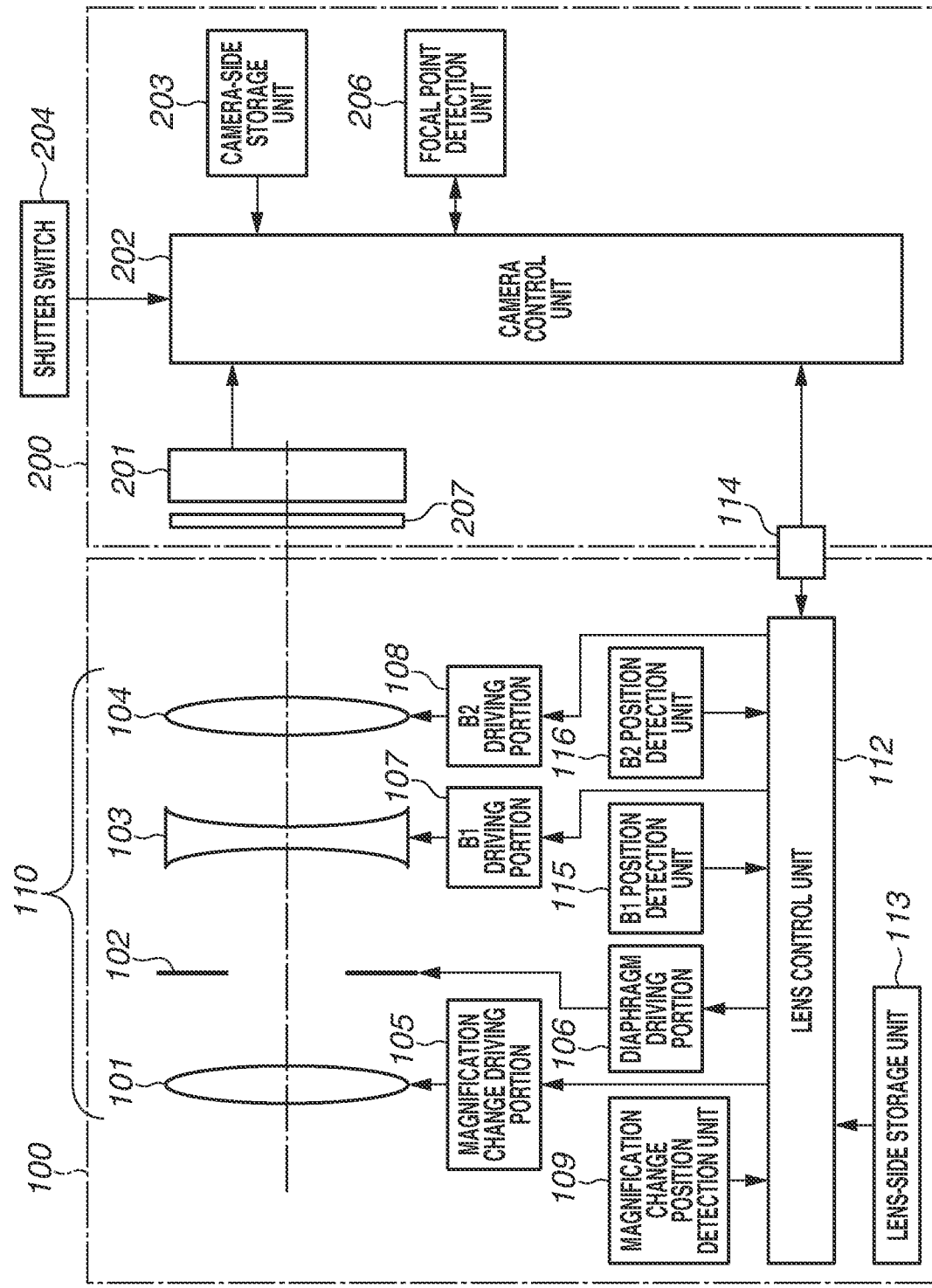
FIG. 1 is a block diagram illustrating an image capturing apparatus and a lens apparatus.

FIG. 1 is a block diagram illustrating a state in which an interchangeable lens 100 as a lens apparatus is mounted on a camera body 200 as an image capturing apparatus in a removable manner.

The interchangeable lens 100 includes an optical system 110. The optical system 110 includes a plurality of lenses and an aperture diaphragm 102. The optical system 110 includes a first focus lens unit 103 and a second focus lens unit 104 which are moved in focusing. The first focus lens unit 103 and the second focus lens unit 104 are moved along a different locus from each other in focusing. In a case in which the optical system 110 is a zoom lens, the optical system 110 includes a zoom lens unit 101 which is moved in changing the magnification. While each lens unit is illustrated as a single positive or negative lens in FIG. 1, each lens unit is needed to include at least one lens and can include a plurality of lenses. Further, the refractive power of each lens unit can be positive or negative. Further, the optical system 110 can include a lens unit (not illustrated) that is not moved in zooming and focusing.

The interchangeable lens 100 includes a lens control unit 112. The lens control unit 112 controls each component of an image capturing optical system. The lens control unit 112 includes a micro-processing unit (MPU) or microcomputer.

A magnification change driving portion 105 drives the zoom lens unit 101 under the control by the lens control unit 112 to arrange the zoom lens unit 101 in a predetermined position. A diaphragm driving portion 106 drives the aperture diaphragm 102 under the control by the lens control unit 112 to adjust an opening of the aperture diaphragm 102 to a predetermined diameter. A B1 driving portion 107 drives the first focus lens unit 103 under the control by the lens control unit 112 to arrange the first focus lens unit 103 in a predetermined position. A B2 driving portion 108 drives the second focus lens unit 104 under the control by the lens control unit 112 to arrange the second focus lens unit 104 in a predetermined position.

The lens control unit 112 detects the position of the zoom lens unit 101 using a magnification change position detection unit 109. The lens control unit 112 detects the position of the first focus lens unit 103 using a B1 position detection unit 115. The lens control unit 112 detects the position of the second focus lens unit 104 using a B2 position detection unit 116.

A lens-side storage unit 113 stores specific information specific to the interchangeable lens 100. The specific information specific to the interchangeable lens 100 includes information about a program and a read-only memory (ROM) that are necessary for an operation of the interchangeable lens 100, an identification number of the interchangeable lens 100, specifications of the interchangeable lens 100, and information about compatibility with a particular function.

In the case in which the interchangeable lens 100 includes an optical element (not illustrated) that can be inserted into and removed from an optical axis of the optical system 110, the specific information about the interchangeable lens 100 includes information about the optical element. Examples of such an optical element include an extender for increasing the lens magnification and an optical filter such as a neutral-density (ND) filter for adjusting the transmittance. The information about the optical element that is included in the specific information about the interchangeable lens 100 includes information about the thickness, refractive index, arranged position, focal length, identification number, and the inserted/removed state of the optical element. The information about the optical element does not have to be information that directly specifies a property of the optical element, such as the thickness of the optical element, and can be information that uniquely defines a property of the optical element.

The lens control unit 112 can communicate with the camera body 200 via a communication terminal portion 114.

The camera body 200 includes an image sensor 201, a camera control unit 202, a camera-side storage unit 203, and a focal point detection unit 206.

The image sensor 201 is a solid-state image sensor (photoelectric conversion element), such as a charge-coupled device (CCD) sensor and complementary metal oxide semiconductor (CMOS) sensor. On a light-receiving surface of the image sensor 201 is provided an optical element 207. The optical element 207 is, for example, an optical low-pass filter or a cover glass for protecting the image sensor 201.

The camera control unit 202 controls each component of the camera body 200. The camera control unit 202 can communicate with the lens control unit 112 via the communication terminal portion 114. The camera control unit 202 includes a MPU or microcomputer.

The camera-side storage unit 203 stores specific information specific to the camera body 200. The specific information specific to the camera body 200 includes information about a program and a ROM that are needed for an operation of the camera body 200, an identification number of the camera body 200, specifications of the camera body 200, and information about compatibility with a particular function. Further, the specific information about the camera body 200 includes information about the optical element 207. The information about the optical element 207 includes information about the identification number, specifications, thickness, refractive index, arranged position, etc. of the optical element 207. The information about the optical element 207 that is included in the specific information about the camera body 200 does not have to be information that directly specifies a property of the optical element 207, such as the thickness of the optical element 207, and can be information that uniquely defines a property of the optical element 207. For example, in a case in which the characteristics of the optical element 207 vary depending on the type of the camera body 200, a camera identifier (ID) that specifies the type of the camera body 200 can be used as the information about the optical element 207.

The interchangeable lens 100 can acquire the specific information about the camera body 200 through communication via the communication terminal portion 114. Further, the camera body 200 can acquire the specific information about the interchangeable lens 100 through communication via the communication terminal portion 114.

Further, the camera body 200 includes a shutter switch 204. The shutter switch 204 in the present exemplary embodiment is designed in such a manner that a user can press the shutter switch 204 in two levels. When the shutter switch 204 is shallowly pressed (half-pressed), the camera body 200 performs an image capturing preparation operation. The image capturing preparation operation includes auto focus adjustment (AF) and photometry.

If AF is started, the camera control unit 202 acquires the current defocus amount using a result of focal point detection by the focal point detection unit 206. The B1 driving portion 107 and the B2 driving portion 108 drive the first focus lens unit 103 and the second focus lens unit 104, respectively, under the control by the lens control unit 112 to positions determined using the defocus amount. Details of how the positions of the first focus lens unit 103 and the second focus lens unit 104 are determined will be described below.

The AF method in the present exemplary embodiment can be any one of a phase-difference AF method, an image plane phase difference AF method, and a contrast AF method. Thus, while FIG. 1 illustrates the example in which the focal point detection unit 206 provided separately from the image sensor 201 performs the focal point detection (defocus amount detection), the image sensor 201 can perform the focal point detection.

Further, when the shutter switch 204 is pressed deeply (fully pressed) by the user, image capturing is started.

Next, another exemplary embodiment of the present invention will be described below.

Figure 2:
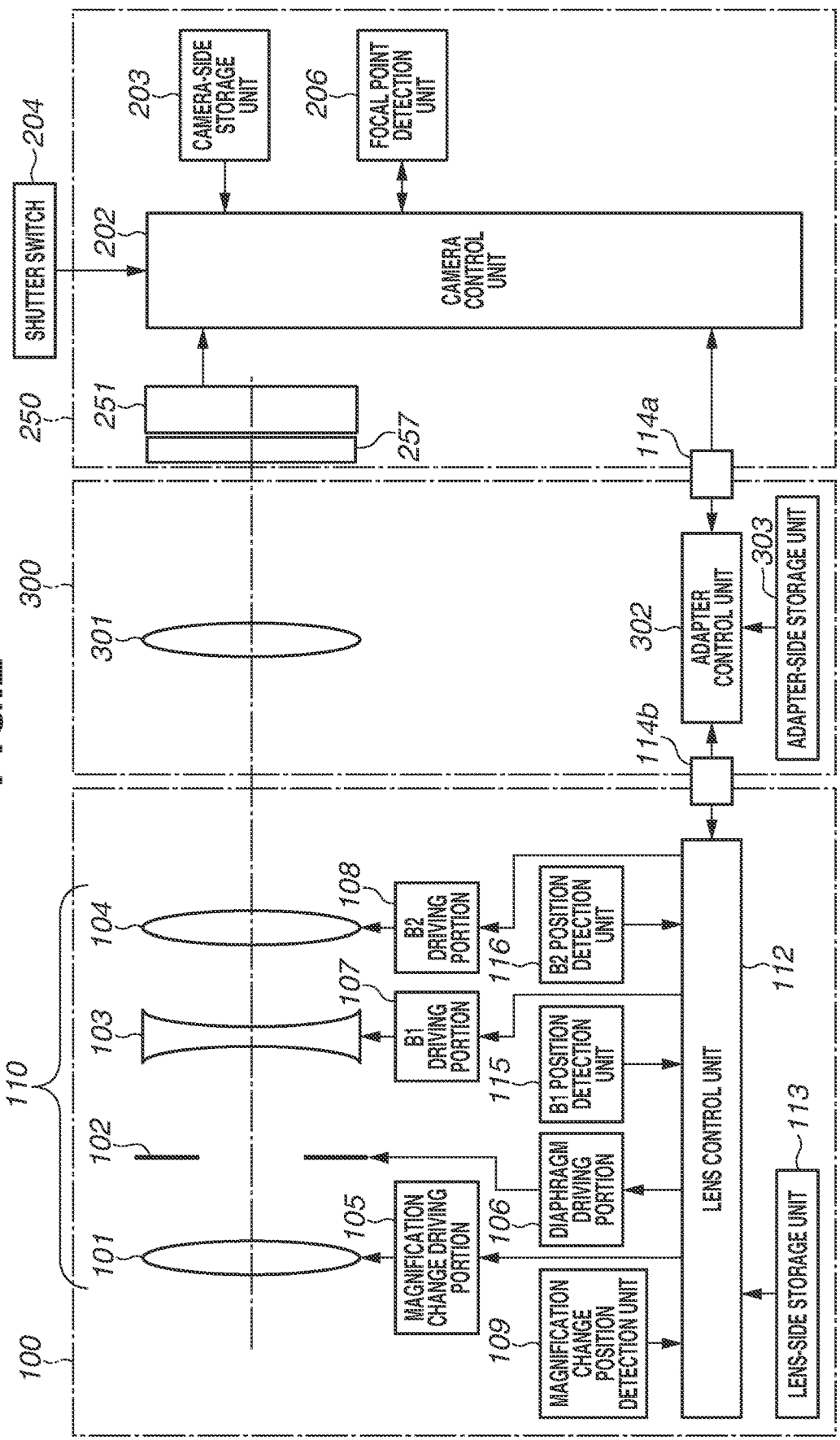
FIG. 2 is a block diagram illustrating the image capturing apparatus, an adapter apparatus, and a lens apparatus.

FIG. 2 is a block diagram illustrating a state in which an adapter apparatus 300 is arranged between the interchangeable lens 100 and a camera body 250. The adapter apparatus 300 is designed to be mountable between the interchangeable lens 100 and the camera body 250. The interchangeable lens 100 is similar to the interchangeable lens 100 illustrated in FIG. 1. The camera body 250 is similar to the camera body 200 illustrated in FIG. 1, except for the thickness of an optical element 257 provided on the front surface of the image sensor 201. The optical element 257 is thicker than the optical element 207 illustrated in FIG. 1. Information about the optical element 257 is stored in the camera-side storage unit 203.

The adapter apparatus 300 includes an optical element 301. The optical element 301 can have refractive power like the lenses or can have substantially no refractive power like the optical filter.

Further, the adapter apparatus 300 includes an adapter control unit 302. The adapter control unit 302 can communicate with the camera control unit 202 via a communication terminal portion 114a. Further, the adapter control unit 302 can communicate with the lens control unit 112 via a communication terminal portion 114b.

An adapter-side storage unit 303 stores specific information specific to the adapter apparatus 300. The specific information specific to the adapter apparatus 300 includes information about a program and a ROM that are needed for an operation of the adapter apparatus 300, an identification number of the adapter apparatus 300, specifications of the adapter apparatus 300, and information about compatibility with a particular function.

Further, the specific information includes information about the optical element 301 of the adapter apparatus 300. Examples of information about the optical element 301 include information about the thickness, refractive index, focal length, identification number, and arranged position of the optical element 301. The information about the optical element 301 that is included in the specific information about the adapter apparatus 300 does not have to be information that directly specifies a property of the optical element 301, such as the thickness of the optical element 301, and can be information that uniquely defines a property of the optical element 301. For example, in the case in which the properties of the optical element 301 vary depending on the type of the adapter apparatus 300, an adapter ID that specifies the type of the adapter apparatus 300 can be used as the information about the optical element 301.

The adapter control unit 302 can transmit the information about the optical element 301 to the lens control unit 112 or the camera control unit 202.

As described above with reference to FIGS. 1 and 2, various optical elements can be arranged between the optical system 110 and the image sensor 201 or 251 according to the status of use of the interchangeable lens 100. Specifically, a first optical element can be arranged between the optical system 110 and the image sensor 201 or 251, or a second optical element different from the first optical element can be arranged between the optical system 110 and the image sensor 201 or 251. The second optical element is an optical element that is different from the first optical element in the refractive index, thickness, focal length, arranged position, etc. Further, there can be a case in which no optical element is arranged between the optical system 110 and the image sensor 201 or 251.

If the optical element 207 or the optical elements 257 and 301 arranged between the optical system 110 and the image sensor 201 or 251 is changed, the imaging performance of the optical system 110 can also be changed. Specifically, a change in the focal length, thickness, refractive index, etc. of the optical element 207 or the optical elements 257 and 301 arranged between the optical system 110 and the image sensor 201 or 251 causes a change in the position of a focus lens for focusing on a particular subject distance. In other words, a change to the focal length, thickness, refractive index, etc. of the optical element 207 or the optical elements 257 and 301 arranged between the optical system 110 and the image sensor 201 or 251 while the position of the focus lens is fixed can cause defocusing.

Further, a change in the focal length, thickness, refractive index, etc. of the optical element disposed between the optical system 110 and the image sensor 201 or 251 causes a change in the amount of aberration that occurs in the entire system including the optical system 110 and the optical element 207 or the optical elements 257 and 301.

The amount of aberration that occurs in the entire system including the optical system 110 and the optical element 207 or the optical elements 257 and 301 is changeable by changing the position of some of the lenses of the optical system 110. Thus, fluctuations in aberration that are caused by the optical element 207 or the optical elements 257 and 301 disposed between the optical system 110 and the image sensor 201 or 251 are compensable by changing the position of some of the lens units of the optical system 110. However, if the amount of aberration in the optical system 110 is changed by moving only one lens unit, the focal point position is changed to cause defocusing.

Thus, the interchangeable lens 100 uses the first focus lens unit 103 and the second focus lens unit 104 to reduce changes in the imaging performance that are caused by the optical element 207 or the optical elements 257 and 301 disposed between the optical system 110 and the image sensor 201 or 251. Further, the arrangement of the first focus lens unit 103 and the second focus lens unit 104 is set differently according to the optical element 207 or the optical elements 257 and 301 disposed between the optical system 110 and the image sensor 201 or 251.

In other words, the arrangement of the first focus lens unit 103 and the second focus lens unit 104 for focusing on a particular subject distance (first subject distance) is set differently according to whether the configuration of the optical element 207 or the optical elements 257 and 301 disposed between the optical system 110 and the image sensor 201 or 251 is a first state or a second state different from the first state. This control corresponds to the setting in which the movement loci of the first focus lens unit 103 and the second focus lens unit 104 are set differently according to the configuration of the optical element 207 or the optical elements 257 and 301 disposed between the optical system 110 and the image sensor 201 or 251. In this way, fluctuations in the amount of aberration are prevented and, at the same time, defocusing is reduced. As used herein, the phrase "the setting in which movement loci are set differently" indicates that the movement loci of the first focus lens unit 103 and the second focus lens unit 104 are set differently between a locus and another locus similar to the locus. Therefore, differently setting only the scale of a locus is not encompassed within the range of "the setting in which the movement loci is set differently" as used herein. In other words, adjusting a locus to another locus similar to the locus according to the configuration of the optical element 207 or the optical elements 257 and 301 is not encompassed within the range of "the setting in which the movement loci is set differently" as used herein.

As used herein, the phrase "the configuration of the optical element 207 or the optical elements 257 and 301 disposed between the optical system 110 and the image sensor 201 or 251" refers to a state regarding the presence/absence of the optical element 207 or the optical elements 257 and 301 between the optical system 110 and the image sensor 201 or 251 and the type of the optical element 207 or the optical elements 257 and 301 disposed between the optical system 110 and the image sensor 201 or 251. For example, the state in which the optical element 207 is disposed between the optical system 110 and the image sensor 201 is the first state (FIG. 1), whereas the state in which the optical elements 257 and 301 are disposed between the optical system 110 and the image sensor 251 is the second state (FIG. 2).

Next, a specific exemplary embodiment for reducing both fluctuations in the amount of aberration and defocusing using the first focus lens unit 103 and the second focus lens unit 104 will be described below.

In the present exemplary embodiment, the camera control unit 202 calculates target positions of the first focus lens unit 103 and the second focus lens unit 104 based on the information about the optical element 207 disposed between the optical system 110 and the image sensor 201.

Thus, in the present exemplary embodiment, the camera control unit 202 acquires the information about the optical element 207 disposed between the optical system 110 and the image sensor 201 before calculating the target positions of the first focus lens unit 103 and the second focus lens unit 104.

Specifically, the camera control unit 202 acquires the specific information about the camera body 200 that is stored in the camera-side storage unit 203 to acquire the information about the optical element 207 of the camera body 200. Further, in the case in which the adapter apparatus 300 including the optical element 301 is mounted between the interchangeable lens 100 and the camera body 200, the camera control unit 202 acquires from the adapter control unit 302 the specific information about the adapter apparatus 300 to acquire the information about the optical element 301.

Further, the camera control unit 202 acquires from the lens control unit 112 the specific information about the interchangeable lens 100. In the present exemplary embodiment, ROM information which is part of the specific information about the interchangeable lens 100 includes position information about the positions of the first focus lens unit 103 and the second focus lens unit 104 corresponding to the focusing distance and zoom position. The position information in the present exemplary embodiment is stored in association with the information about the optical element 207 disposed between the optical system 110 and the image sensor 201.

The position information is stored at least in such a manner that the positions of the first focus lens unit 103 and the second focus lens unit 104 are calculable based on the information about the optical element 207. For example, the position information can be stored as information about the optical element 207, such as the thickness and refractive index, and a coefficient of a function having the zoom position, focusing distance, etc. as variable numbers. Further, the position information can be stored as table data in association with the information about the optical element 207. Specifically, a plurality of pieces of information about the loci of the first focus lens unit 103 and the second focus lens unit 104 is at least stored based on the information about the optical element 207.

Further, in the case in which the interchangeable lens 100 includes the optical element that can be inserted into and removed from the optical path, the specific information about the interchangeable lens 100 includes information about the optical element.

The camera control unit 202 calculates the target positions of the first focus lens unit 103 and the second focus lens unit 104 using the acquired specific information about the camera body 200, the adapter apparatus 300, and the interchangeable lens 100. The information about the calculated target positions is transmitted to the lens control unit 112.

A method of controlling the first focus lens unit 103 and the second focus lens unit 104 that is performed at the camera control unit 202 in the present exemplary embodiment will be described below with reference to the flowchart in FIG. 3. In the flowchart, "S" indicates a step. Further, the process described below can be implemented as a program for causing a computer to realize the functions of the respective steps.

Figure 3:
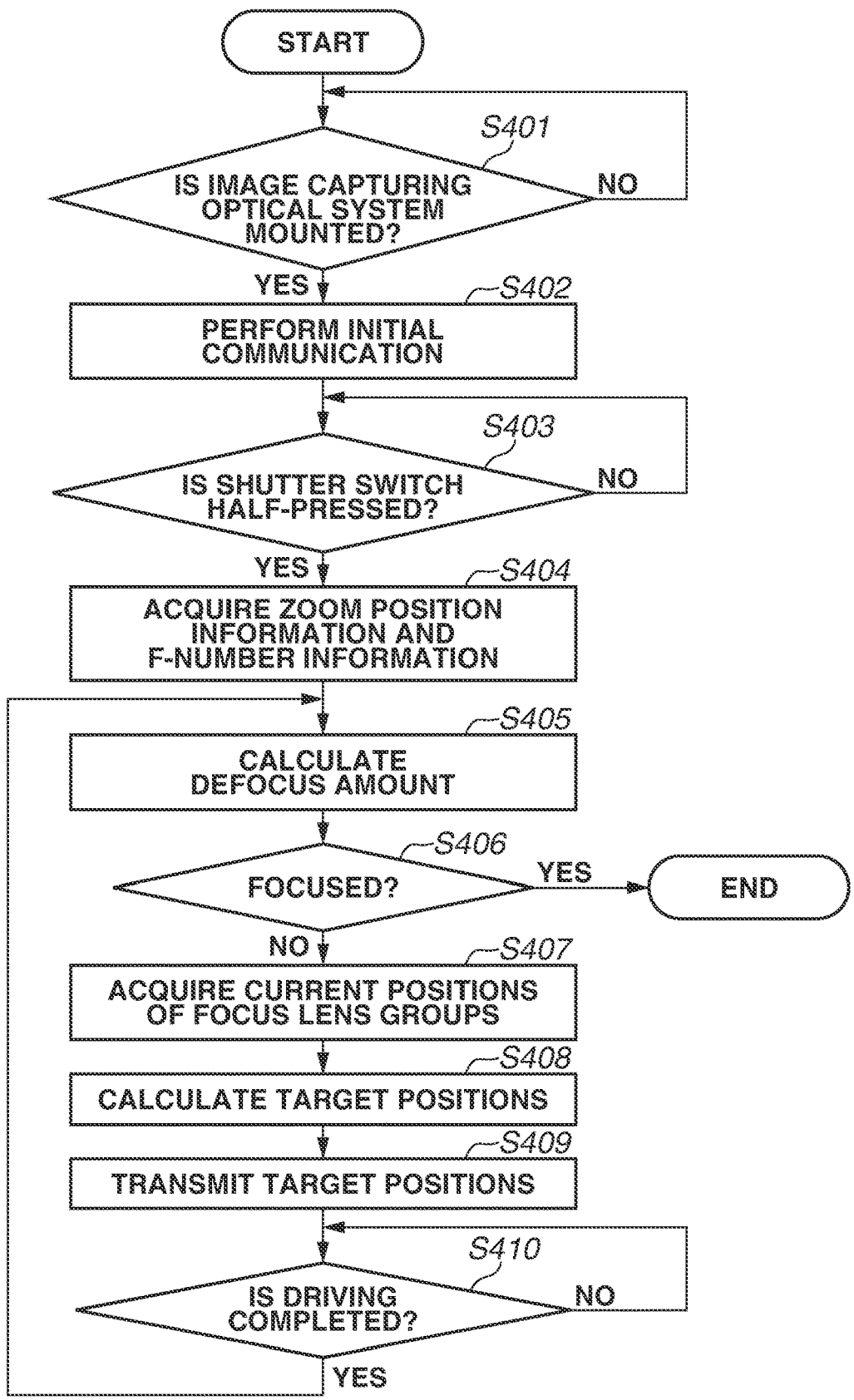
FIG. 3 is a flowchart according to a first exemplary embodiment.

The processing of the flowchart in FIG. 3 is started from the state in which the camera body 200 is turned on.

In step S401, the camera control unit 202 determines whether the interchangeable lens 100 is mounted on the camera body 200. In a case where the interchangeable lens 100 is not mounted on the camera body 200 (NO in step S401), the processing of step S401 is repeated.

In a case where the interchangeable lens 100 is mounted (YES in step S401), the processing proceeds to step S402. In step S402, the camera control unit 202 starts initial communication with the lens control unit 112. In the case in which the adapter apparatus 300 is mounted between the interchangeable lens 100 and the camera body 200, the camera control unit 202 also performs initial communication with the adapter control unit 302.

In the initial communication, the camera control unit 202 acquires from the lens control unit 112 the specific information about the interchangeable lens 100. Further, the camera control unit 202 acquires from the adapter control unit 302 the specific information about the adapter apparatus 300. Specifically, in step S402, the camera control unit 202 transmits to the lens control unit 112 and the adapter control unit 302 an instruction to transmit the specific information and acquires the specific information transmitted in response to the instruction.

In step S403, the camera control unit 202 determines whether the shutter switch 204 is half-pressed. In a case where the shutter switch 204 is half-pressed by a user operation (YES in step S403), an AF operation as an image capturing preparation operation is started. In a case where the shutter switch 204 is not half-pressed (NO in step S403), the processing of step S403 is repeated.

In the case in which the interchangeable lens 100 includes the optical element that can be inserted into and removed from the optical path, the camera control unit 202 can acquire before or after the processing procedure of step S403 from the lens control unit 112 information about the insertion/removal state of the optical element of the interchangeable lens 100. This enables the camera control unit 202 to determine whether the optical element of the interchangeable lens 100 is inserted/removed between the initial communication and the AF operation.

In step S404, the camera control unit 202 acquires from the lens control unit 112 the current position of the zoom lens unit 101 and an F-number. Specifically, the camera control unit 202 transmits to the lens control unit 112 an instruction to transmit the position of the zoom lens unit 101 and the F-number and receives information about the position of the zoom lens unit 101 and the F-number that is transmitted in response to the instruction. The information about the position of the zoom lens unit 101 and the F-number is used in the focus determination which is performed later. As used herein, the F-number refers to the maximum aperture or the current F-number.

In step S405, the camera control unit 202 calculates a defocus amount based on the output of the focal point detection unit 206.

In step S406, the camera control unit 202 performs focus determination. The focus determination is performed based on whether the defocus amount calculated in step S405 is greater than a threshold value T. The threshold value T for use in the focus determination is set by, for example, the following formula (A):

$$T = FNO \times \delta \quad (A),$$

where FNO is the F-number, and $\delta$ is the diameter of the least circle of confusion.

In a case where the defocus amount is less than the threshold value T (YES in step S406), it is focused, so that the process is ended.

On the other hand, in a case where the defocus amount is not less than the threshold value T (NO in step S406), the processing proceeds to step S407. In step S407, the camera control unit 202 acquires from the lens control unit 112 the current positions of the first focus lens unit 103 and the second focus lens unit 104. Specifically, the camera control unit 202 transmits to the lens control unit 112 an instruction to transmit information about the current positions of the first focus lens unit 103 and the second focus lens unit 104, and acquires information transmitted in response to the instruction.

In step S408, the camera control unit 202 calculates the target positions of the first focus lens unit 103 and the second focus lens unit 104 based on the current positions of the first focus lens unit 103 and the second focus lens unit 104, the defocus amount, and the specific information. As the target positions, the positions of the first focus lens unit 103 and the second focus lens unit 104 after being driven can be calculated, or the driving amounts of the first focus lens unit 103 and the second focus lens unit 104 can be calculated.

In step S409, the camera control unit 202 transmits to the lens control unit 112 information about the target positions of the first focus lens unit 103 and the second focus lens unit 104 that are calculated in step S408.

After acquiring from the camera control unit 202 the information about the target positions of the first focus lens unit 103 and the second focus lens unit 104, the lens control unit 112 drives the first focus lens unit 103 and the second focus lens unit 104. Specifically, the lens control unit 112 transmits to the B1 driving portion 107 and the B2 driving portion 108 signals for driving the first focus lens unit 103 and the second focus lens unit 104, respectively.

In step S410, the camera control unit 202 determines whether the driving of the first focus lens unit 103 and the second focus lens unit 104 is completed. In a case where the driving is not completed (NO in step S410), the processing of step S410 is repeated. On the other hand, in a case where the driving is completed (YES in step S410), the processing returns to step S405.

As described above, the AF operation is performed by repeating steps S405 to S410 until it is focused (YES in step S406).

In this way, the target positions of the two focus lens units 103 and 104 are determined based on the information about the optical element, i.e., the optical element 207, and/or the optical elements 257 and 301, disposed between the interchangeable lens 100 and the image sensor 201 so that fluctuations in the amount of aberration and defocusing are both reduced.

Next, a second exemplary embodiment will be described below.

The present exemplary embodiment is different from the first exemplary embodiment in that the lens control unit 112 calculates the target positions of the first focus lens unit 103 and the second focus lens unit 104 based on the information about the optical element 207 disposed between the optical system 110 and the image sensor 201.

Thus, in the present exemplary embodiment, the lens control unit 112 acquires the information about the optical element 207 disposed between the optical system 110 and the image sensor 201 before calculating the target positions of the first focus lens unit 103 and the second focus lens unit 104.

The lens control unit 112 acquires the specific information about the interchangeable lens 100 that is stored in the lens-side storage unit 113. The specific information about the interchangeable lens 100 includes information about the positions of the first focus lens unit 103 and the second focus lens unit 104, as in the first exemplary embodiment. Further, in the case in which the interchangeable lens 100 includes the optical element that can be inserted into and removed from the optical path, the specific information about the interchangeable lens 100 includes information about the optical element.

Further, the lens control unit 112 acquires the specific information about the camera body 200 that is stored in the camera-side storage unit 203 to acquire the information about the optical element 207 of the camera body 200. Further, in the case in which the adapter apparatus 300 including the optical element 301 is disposed between the interchangeable lens 100 and the camera body 200, the lens control unit 112 acquires from the adapter control unit 302 the specific information about the adapter apparatus 300 to acquire the information about the optical element 301.

The lens control unit 112 calculates the target positions of the first focus lens unit 103 and the second focus lens unit 104 using at least one of the acquired specific information about the camera body 200, the adapter apparatus 300, and the interchangeable lens 100. Further, the lens control unit 112 drives the first focus lens unit 103 and the second focus lens unit 104 based on the information about the calculated target positions of the first focus lens unit 103 and the second focus lens unit 104.

A method of controlling the first focus lens unit 103 and the second focus lens unit 104 that is performed by the lens control unit 112 in the present exemplary embodiment will be described below with reference to the flowchart in FIG. 4.

Figure 4:
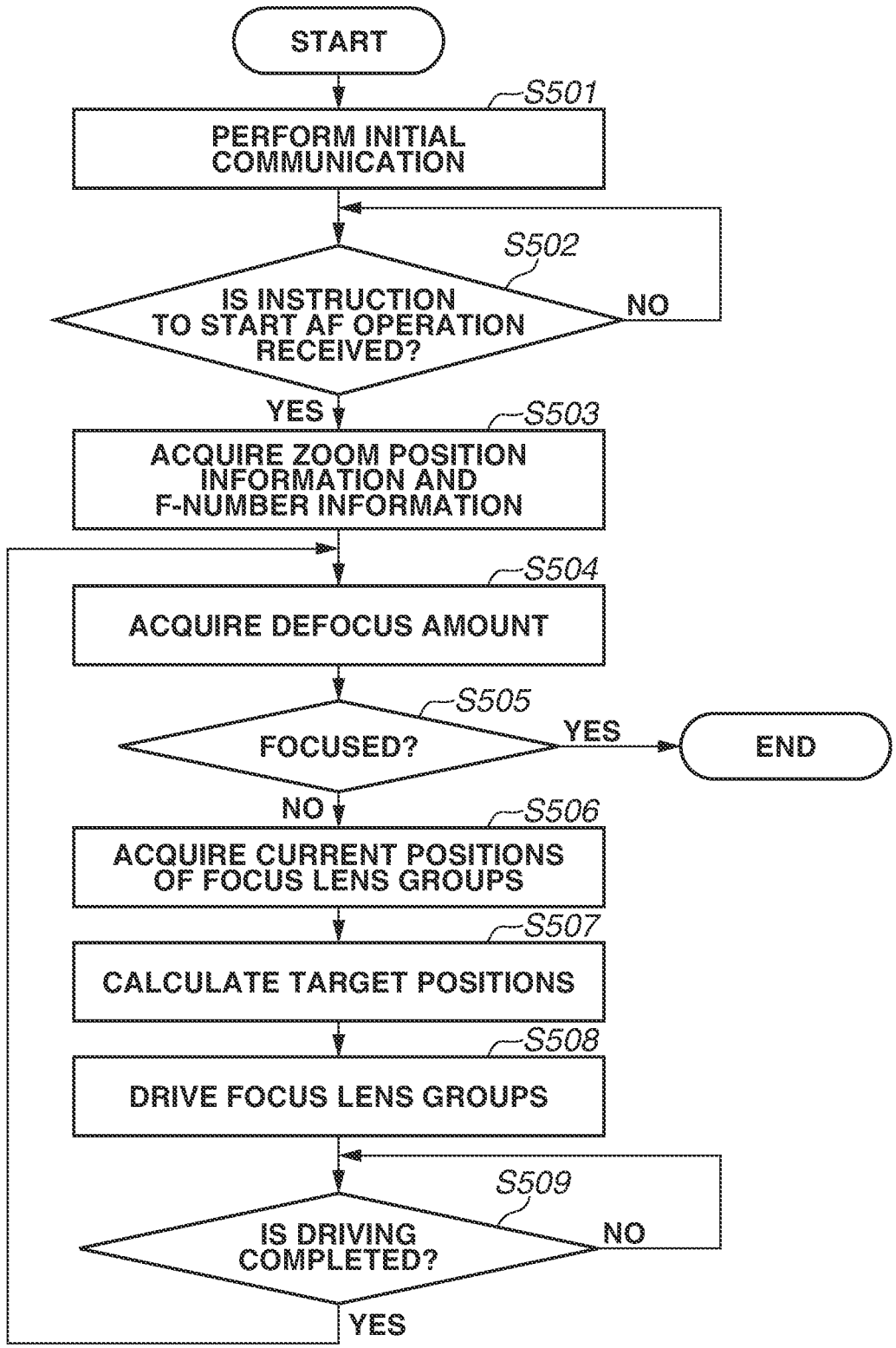
FIG. 4 is a flowchart according to a second exemplary embodiment.

The processing of the flowchart in FIG. 4 is started from the state in which the interchangeable lens 100 is mounted on the camera body 200 (or on the adapter apparatus 300 mounted on the camera body 200).

In step S501, the lens control unit 112 performs initial communication in response to a request from the camera body 200 for a start of initial communication. In the case in which the adapter apparatus 300 is mounted between the interchangeable lens 100 and the camera body 200, the lens control unit 112 also performs initial communication with the adapter control unit 302. In the initial communication, the lens control unit 112 acquires from the camera control unit 202 the specific information about the camera body 200. Further, the lens control unit 112 acquires from the adapter control unit 302 the specific information about the adapter apparatus 300.

In step S502, the lens control unit 112 determines whether an instruction to start an AF operation is received from the camera control unit 202. In a case where an instruction to start an AF operation is received (YES in step S502), the processing proceeds to step S503. On the other hand, in a case where an instruction to start an AF operation is not received (NO in step S502), the processing of step S502 is repeated.

In step S503, the lens control unit 112 acquires the current position of the zoom lens unit 101 and the F-number. The position of the zoom lens unit 101 and the F-number of the maximum aperture are used in the focus determination which is performed later.

In step S504, the lens control unit 112 acquires the current defocus amount from the camera control unit 202.

In step S505, the lens control unit 112 performs focus determination. The focus determination is performed based on whether the defocus amount acquired in step S504 is greater than the threshold value T described above in the first exemplary embodiment. In the present exemplary embodiment, the focus determination can be performed by the camera control unit 202. In this case, the lens control unit 112 acquires the focus determination result from the camera control unit 202 in step S505.

In step S505, in a case where the lens control unit 112 determines that it is focused (YES in step S505), the processing is ended.

On the other hand, in a case where it is not focused (NO in step S505), the processing proceeds to step S506. In step S506, the lens control unit 112 acquires the current positions of the first focus lens unit 103 and the second focus lens unit 104 from the B1 position detection unit 115 and the B2 position detection unit 116.

In step S507, the lens control unit 112 calculates the target positions of the first focus lens unit 103 and the second focus lens unit 104 based on the current positions of the first focus lens unit 103 and the second focus lens unit 104, the defocus amount, and the specific information.

In step S508, the lens control unit 112 drives the first focus lens unit 103 and the second focus lens unit 104. Specifically, the lens control unit 112 drives the first focus lens unit 103 and the second focus lens unit 104 using the B1 driving portion 107 and the B2 driving portion 108 based on the target positions calculated in step S507.

In step S509, the lens control unit 112 determines whether the driving of the first focus lens unit 103 and the second focus lens unit 104 is completed. In a case where the driving is not completed (NO in step S509), the processing of step S509 is repeated. On the other hand, in a case where the driving is completed (YES in step S509), the processing returns to step S504. Alternatively, the processing in step S509 can be performed by determining whether a predetermined time passes from the time of the start of the driving of the first focus lens unit 103 and the second focus lens unit 104.

As described above, the AF operation is performed by repeating the processing of steps S504 to S509 until it is focused (YES in step S505).

In this way, the target positions of the two focus lens units 103 and 104 are determined based on the information about the optical element, i.e., the optical element 207, and/or the optical elements 257 and 301, disposed between the interchangeable lens 100 and the image sensor 201 so that fluctuations in the amount of aberration and defocusing are both reduced.

In the first and second exemplary embodiments described above, the information about the optical element 207 is desirably information from which at least one of the thickness and the refractive index of the optical element 207 disposed between the optical system 110 and the image sensor 201 is identifiable. Specifically, the information about the optical element 207 is desirably information from which the lens control unit 112 or the camera control unit 202 can identify at least one of the thickness and the refractive index of the optical element 207.

In this way, the calculation of the target positions of the first focus lens unit 103 and the second focus lens unit 104 for correcting fluctuations in the amount of aberration and defocusing caused by the optical element 207 is performed with great accuracy.

Next, desirable conditions with respect to the optical system 110 of the interchangeable lens 100 in the respective exemplary embodiments will be described below.

Desirably, the optical system 110 satisfies the following relationship specified by formula (1):

$$\left(\frac{S1}{|S1|}\right) \times \left(\frac{X1}{|X1|}\right) + \left(\frac{S2}{|S2|}\right) \times \left(\frac{X2}{|X2|}\right) = 0. \tag{1}$$

The arrangement of the first focus lens unit 103 and the second focus lens unit 104 for focusing on the particular subject distance (first subject distance) in the first state is referred to as "first arrangement". Further, the arrangement of the first focus lens unit 103 and the second focus lens unit 104 for focusing on the first subject distance in the second state is referred to as "second arrangement".

In this case, S1 and S2 are the position sensitivities of the first focus lens unit 103 and the second focus lens unit 104 in the first arrangement, respectively. The position sensitivity is the ratio of the movement distance of an image plane IP to the movement distance of the focus lens unit 103 or 104. X1 and X2 are the amounts of movement of the first focus lens unit 103 and the second focus lens unit 104 in changing from the first arrangement to the second arrangement, respectively. Further, the X1 and X2 are positive in a case of a movement toward an image or negative in a case of a movement toward an object.

S1 and S2 are obtained by the following formulas (1a) and (1b):

$$S1 = (1 - \beta i1^2) \times \beta i1r^2 \tag{1a, and}$$

$$S2 = (1 - \beta i2^2) \times \beta i2r^2 \tag{1b}.$$

In formula (1a) and (1b), $\beta i1$ and $\beta i2$ are the lateral magnifications of the first focus lens unit 103 and the second focus lens unit 104 in the first arrangement, respectively. Further, $\beta i1r$ and $\beta i2r$ are the combined lateral magnifications of the lens units 103 and 104 that are disposed on the image sides of the lens units B1 and B2 in the first arrangement, respectively.

The focal point position is maintained substantially constant between the first and second arrangements by moving the first focus lens unit 103 and the second focus lens unit 104 such that the sum of the first and second items of the left side of formula (1) becomes zero. Further, the two focus lens units 103 and 104 are moved as described above so that fluctuations in spherical aberration and field curvature between the first and second arrangements are reduced.

Further, the optical system 110 desirably satisfies the following formula (2):

$$0.95<(\beta i1\times\beta i2)/(\beta j1\times\beta j2)<1.15 \quad (2).$$

In formula (2), $\beta j1$ and $\beta j2$ are the lateral magnifications of the first focus lens unit 103 and the second focus lens unit 104 in the second arrangement.

The ratio between $\beta i1\times\beta i2$ and $\beta j1\times\beta j2$ indicates a change in the magnification during a change from the first arrangement to the second arrangement. If the upper limit value or lower limit value of formula (2) is exceeded, it becomes difficult to reduce the amount of change in the angle of view between the first and second arrangements.

Further, the optical system 110 is desirably configured such that the arrangement of the focus lens units is changeable between the first and second arrangements at the shortest distance (corresponding to minimum object distance). In this case, the lateral magnification (image magnification) $\beta$ of the optical system 110 at the shortest distance desirably satisfies the following formula (3). The shortest distance refers to the shortest distance within a distance range on which the optical system 110 is able to focus.

$$\beta<-0.1 \quad (3)$$

Formula (3) is the conditional expression that specifies the image magnification (lateral magnification) in the case of focusing on the shortest distance and indicates that the absolute value of the image magnification is sufficiently large. Satisfying formula (3) makes it possible to sufficiently reduce the shortest distance, and changes in the imaging performance that are caused by the optical element, the optical element 207, and/or the optical elements 257 and 301 are reduced. The image magnification at the shortest distance can be compensated by enlargement with an electronic zoom, etc., but this requires highly-accurate aberration correction and leads to an increase in the size of the optical system 110.

Next, optical systems LA according to third and fourth exemplary embodiments of the present invention that are included in the lens apparatus will be described below. The optical systems LA according to the third and fourth exemplary embodiments are each an optical system applicable as the optical system 110 illustrated in FIGS. 1 and 2. The optical systems LA according to the third and fourth exemplary embodiments described below are an image capturing optical system for use in an image capturing apparatus such as a video camera, digital still camera, silver-halide film camera, or camera for broadcasting.

Figure 5:
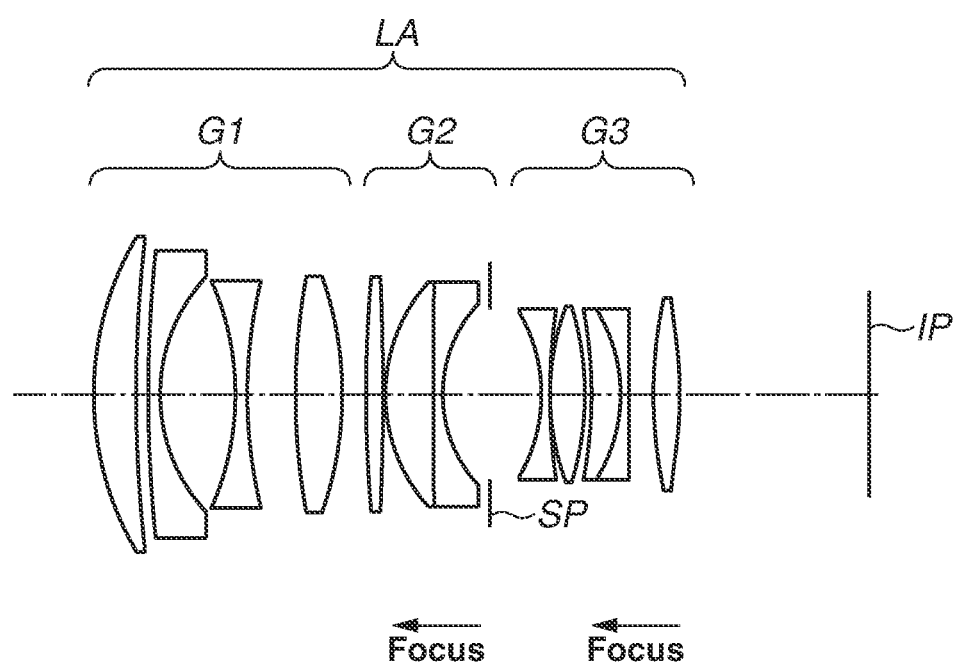
FIG. 5 is a cross-sectional view illustrating an optical system according to a third exemplary embodiment in a case in which no optical element is disposed on the object side of an image plane.

FIG. 5 is a cross-sectional view illustrating the optical system LA according to the third exemplary embodiment in focusing on an object at infinity.

The optical system LA includes a first lens unit G1 having negative refractive power, a second lens unit G2 having positive refractive power, and a third lens unit G3 having positive refractive power in this order from the object side to the image side. The second lens unit G2 and the third lens unit G3 are moved to the object side in focusing from infinity to a short distance. The second lens unit G2 corresponds to the first focus lens unit 103 in FIG. 1. The third lens unit G3 corresponds to the second focus lens unit 104 in FIG. 1.

An aperture diaphragm SP determines (limits) the light flux of the maximum aperture. On an image plane IP, an image capturing plane or a film of a solid-state image sensor (photoelectric conversion element), such as a CCD sensor or CMOS sensor, is arranged.

In the cross-sectional view illustrated in FIG. 5, no optical element is disposed between the optical system LA and the image plane IP. In the present exemplary embodiment, the optical element configuration in which no optical element is disposed between the optical system LA and the image plane IP is referred to as the first state. Further, the arrangement of the second lens unit G2 and the third lens unit G3 focusing on infinity in the first state is referred to as the first arrangement.

Figure 6:
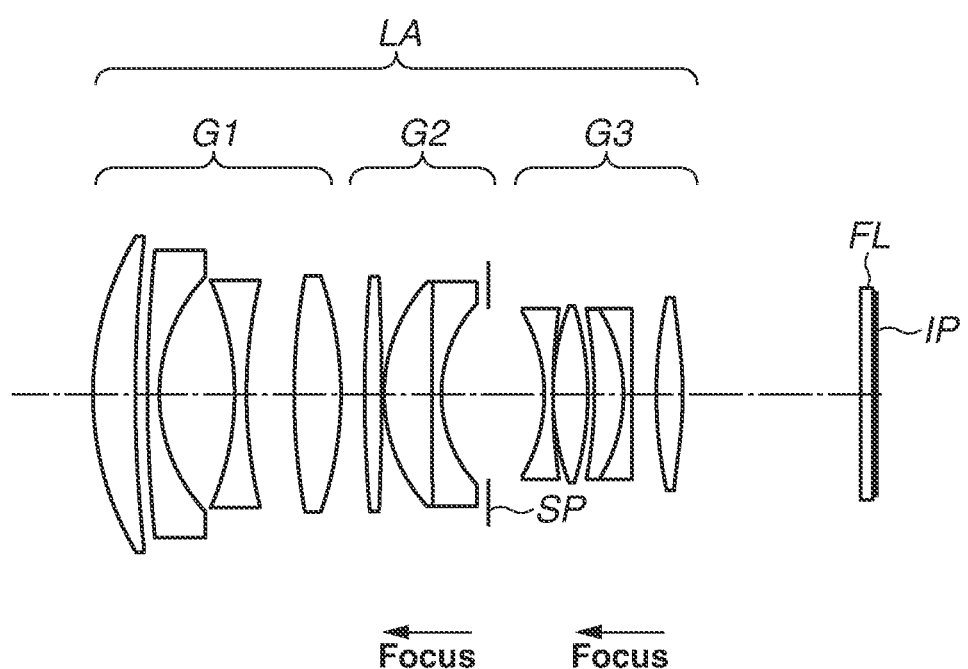
FIG. 6 is a cross-sectional view illustrating the optical system according to the third exemplary embodiment in a case in which an optical element is disposed on the object side of the image plane.

FIG. 6 is a cross-sectional view illustrating the focusing on an object at infinity in the case in which an optical element FL is disposed between the optical system LA and the image plane IP, according to the present exemplary embodiment. The optical element FL corresponds to the optical element 207 in FIG. 1. The optical element FL is, for example, a ND filter or optical low-pass filter. In the present exemplary embodiment, the optical element configuration in which the optical element FL is disposed between the optical system LA and the image plane IP is referred to as the second state. Further, the arrangement of the second lens unit G2 and the third lens unit G3 focusing on infinity in the second state is referred to as the second arrangement.

In the second arrangement, the second lens unit G2 disposed closer to the object side than in the first arrangement. Specifically, the distance between the second lens unit G2 and the first lens unit G1 in the second arrangement is shorter than that in the first arrangement.

Further, in the second arrangement, the third lens unit G3 is disposed closer to the image side than in the first arrangement. Specifically, the distance between the second lens unit G2 and the third lens unit G3 in the second arrangement is greater than that in the first arrangement.

As described above, although the focusing distance is the same, the amount of aberration in the optical system LA is changeable by changing the arrangement of the second lens unit G2 and the third lens unit G3 according to the optical element FL disposed between the optical system LA and the image plane IP. In this way, fluctuations in the amount of aberration and defocusing that are caused by the optical element FL disposed between the optical system LA and the image plane IP are both reduced.

In the present exemplary embodiment, the second lens unit G2 and the third lens unit G3 are both moved to the object side to reduce the distance between the second lens unit G2 and the third lens unit G3 in focusing from infinity to a short distance regardless of whether the optical element FL is present or absent. In this way, the incident height of light beams on the third lens unit G3 at the short distance is decreased. Further, in the present exemplary embodiment, the angle of incidence of light beams incident on the third lens unit G3 can be reduced with ease, compared to the case in which the second lens unit G2 and the third lens unit G3 are integrally brought in focusing, so that coma aberrations are effectively corrected.

Further, in the case in which the second lens unit G2 and the third lens unit G3 are integrally brought to perform focusing, spherical aberrations are likely to increase in the minus direction in focusing from infinity to a short distance. Thus, it is difficult to obtain suitable optical performance in the focusing on an object at a short distance. In the present exemplary embodiment, on the contrary, the second lens unit G2 and the third lens unit G3 are both moved in focusing to change the distance between the second lens unit G2 and the third lens unit G3. In this way, spherical aberrations that occur in the second lens unit G2 are effectively corrected by the third lens unit G3.

FIGS. 7A to 8C are aberration diagrams of the optical system LA according to the present exemplary embodiment. In the aberration diagrams, Fno is the F-number, and θ is the half angle of view (degrees). In the spherical aberration diagrams, each real line represents a d-line (wavelength 587.56 nm), and each two-dot chain line represents a g-line (wavelength 435.8 nm). In the astigmatism diagrams, each real line represents the sagittal image plane with respect to the d-line, and each dotted line represents the meridional image plane with respect to the d-line. The distortion aberrations are those for the d-line. The magnification chromatic aberration diagrams show chromatic aberrations of the g-line with respect to the d-line. The same applies to the aberration diagrams described below.

Figure 7A:
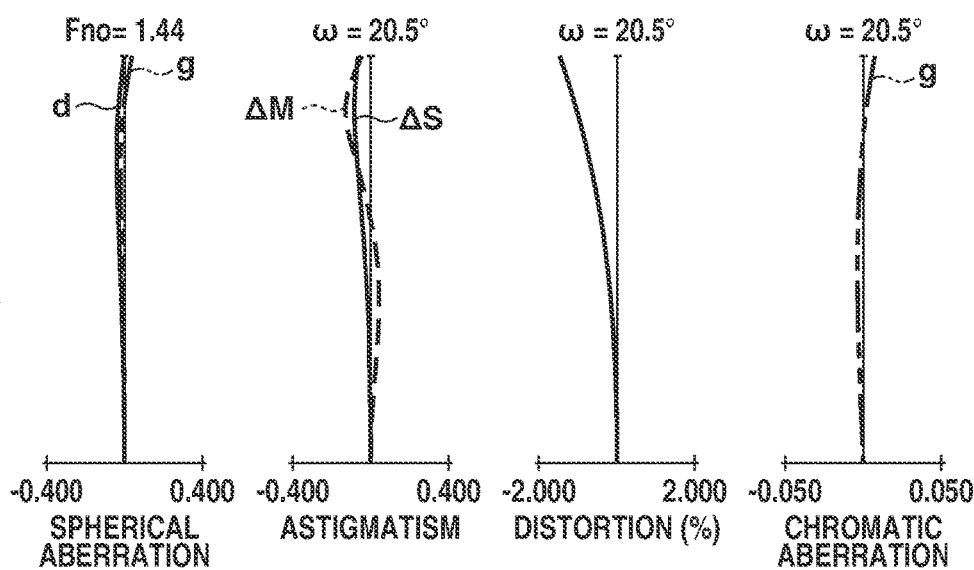
FIGS. 7A, 7B, and 7C are aberration diagrams of the optical system according to the third exemplary embodiment in the case in which no optical element is disposed on the object side of the image plane.
Figure 7B:
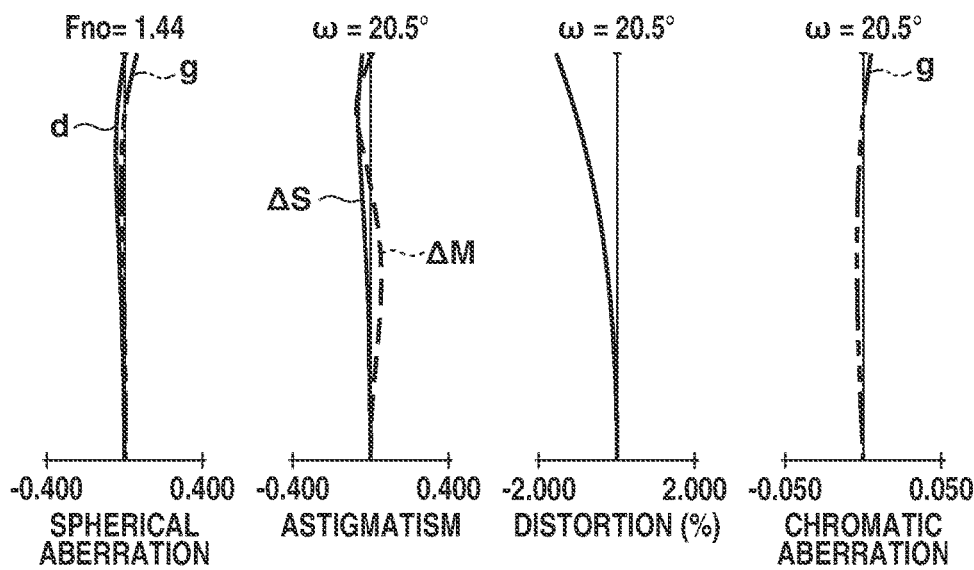
Figure 7C:
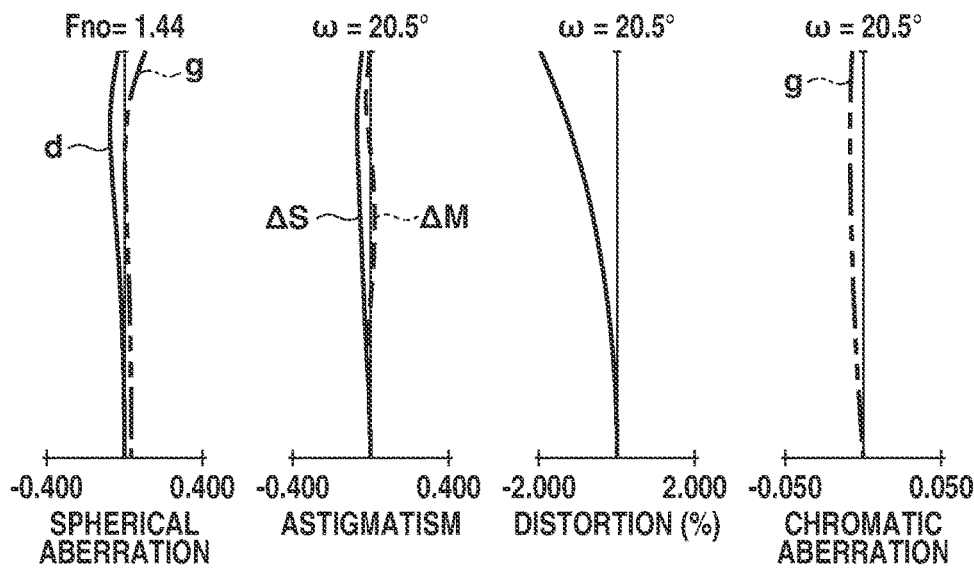

FIGS. 7A, 7B, and 7C are aberration diagrams of the optical system LA according to the present exemplary embodiment in the first state in focusing on an object at infinity in the case in which the imaging magnification is −0.02 and in the case in which the imaging magnification is −0.12.

Figure 8A:
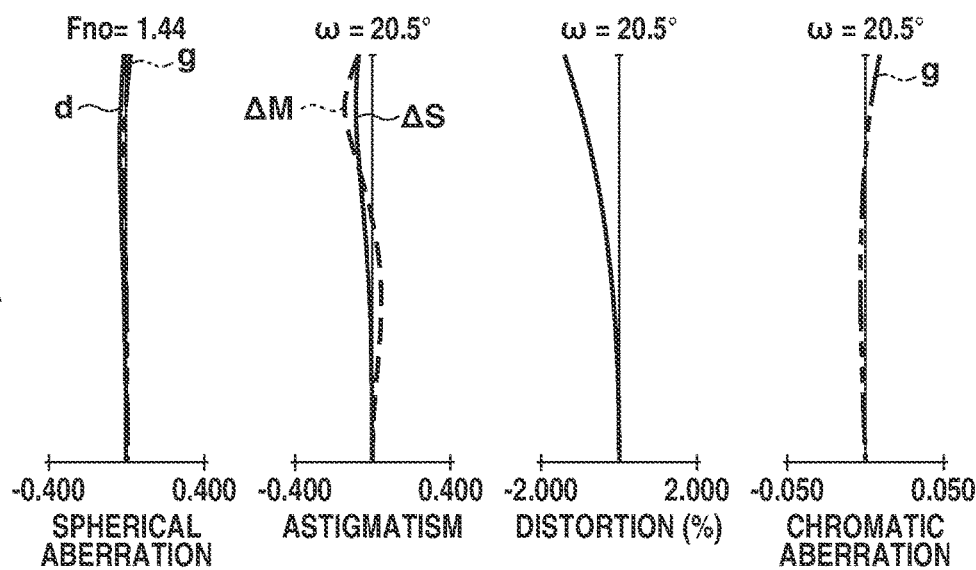
FIGS. 8A, 8B, and 8C are aberration diagrams of the optical system according to the third exemplary embodiment in the case in which the optical element is disposed on the object side of the image plane.
Figure 8B:
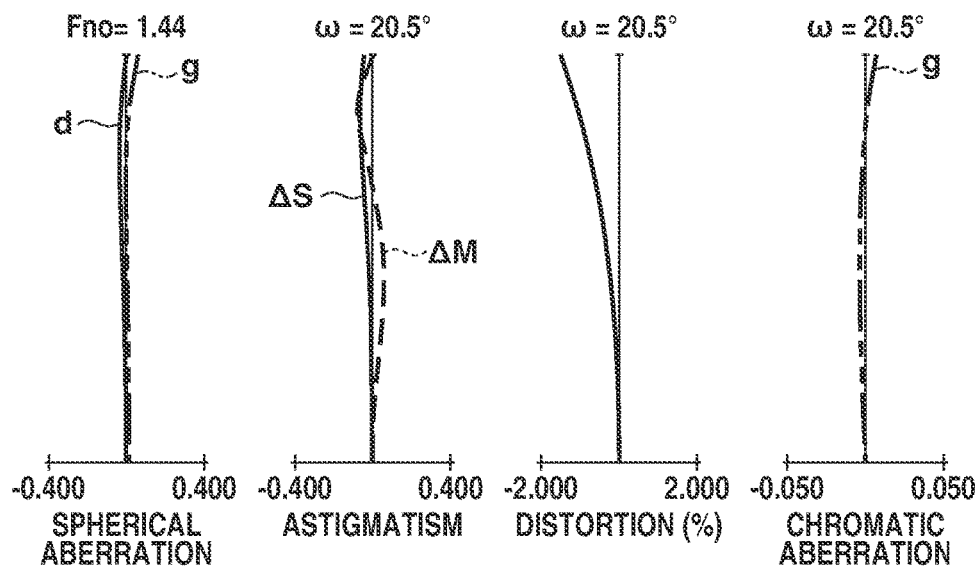
Figure 8C:
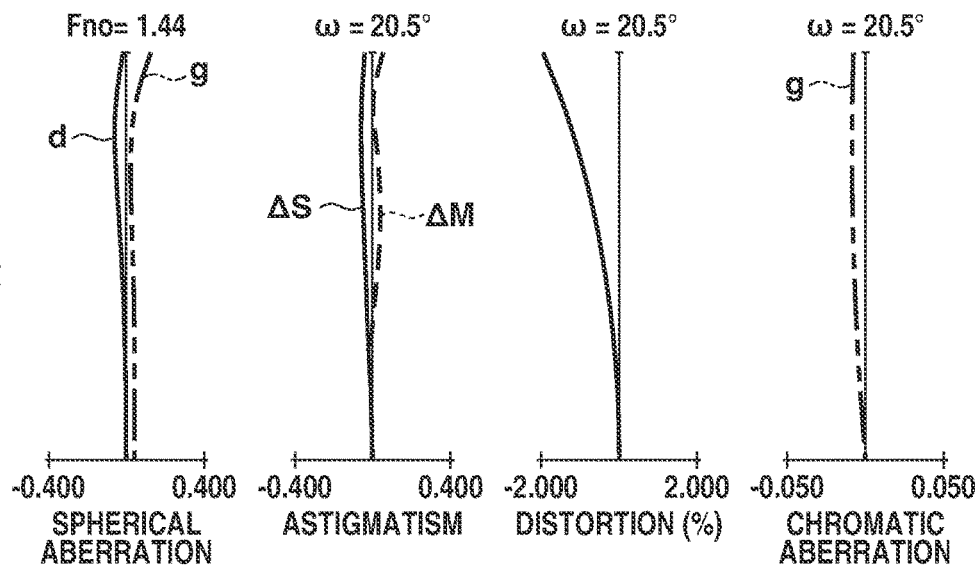

FIGS. 8A, 8B, and 8C are aberration diagrams of the optical system LA according to the present exemplary embodiment in the second state in focusing on an object at infinity in the case in which the imaging magnification is −0.02 and in the case in which the imaging magnification is −0.12.

Next, numerical examples of the optical system LA according to the present exemplary embodiment will be described below. The numerical examples illustrate the first and second states in the optical system LA.

In the numerical examples, r is the curvature radius of each plane, and d and di are the distance between the ith plane and the (i+1)th plane. Further, i is a natural number and indicates the order of the plane counted from the object side. The distances specified as "(variable)" in the surface data are collectively specified in Table 1.

Further, nd and vd are the refractive index and the Abbe's number of the material of an optical component based on the d-line as a reference. BF is the back focus.

The aspherical surface shape is represented by the following formula (4):

$$X = \frac{\frac{H^2}{R}}{1 + \sqrt{1 - (1+K)\left(\frac{H}{R}\right)^2}} + A4H^4 + A6H^6 + A8H^8 + A10H^{10} + A12H^{12}, \quad (4)$$

where the X-axis is in the optical axis direction, the H-axis is in the perpendicular direction to the optical axis, R is the paraxial curvature radius with the light travel direction being positive, K is a conic constant, and A4 to A12 are aspherical surface coefficients.

Each aspherical surface is given "*" in the surface data.
In the aspherical surface data, "e-x" indicates $10_{-x}$.
Further, f is the focal length, and Fno is the F-number. Further, ω is the half angle of view. For ω, values obtained by paraxial calculation are specified.

First State (Third Exemplary Embodiment)

| | | | | |
|---|---|---|---|---|
| | | Unit mm | | |
| | | Surface Data | | |
| Surface Number | r | d | nd | vd |
| 1 | 65.463 | 8.89 | 1.83481 | 42.7 |
| 2 | 287.195 | 2.55 | | |
| 3 | 292.460 | 2.50 | 1.53172 | 48.8 |
| 4 | 36.503 | 15.80 | | |
| 5 | −59.042 | 2.50 | 1.68948 | 31.0 |
| 6 | 100.395 | 10.02 | | |
| 7 | 135.925 | 9.83 | 1.77250 | 49.6 |
| 8 | −74.480 | (variable) | | |
| 9 | 280.199 | 3.57 | 1.80810 | 22.8 |
| 10 | −537.389 | 0.50 | | |
| 11 | 35.430 | 10.05 | 1.81600 | 46.6 |
| 12 | 1654.496 | 2.00 | 1.72047 | 34.7 |
| 13 | 28.181 | 9.85 | | |
| 14 (diaphragm) | ∞ | (variable) | | |
| 15 | −34.362 | 1.80 | 1.65412 | 39.7 |
| 16 | 126.775 | 0.00 | | |
| 17 | 52.735 | 7.33 | 1.81600 | 46.6 |
| 18 | −62.749 | 1.40 | | |
| 19 | −95.382 | 6.10 | 1.59522 | 67.7 |
| 20 | −33.833 | 1.80 | 1.69895 | 30.1 |
| 21 | −2643.237 | 5.11 | | |
| 22 | 95.305 | 5.54 | 1.77250 | 49.5 |
| 23* | −76.576 | (variable) | | |
| Image Plane | ∞ | | | |
| | | Aspherical Surface Data | | |
| | | 23$^{rd}$ Surface | | |

K = 0.00000e+000    A4 = 4.72668e−006    A6 = −1.93156e−010    A8 = 3.88955e−012

-continued

| Unit mm | |
|---|---|
| Focal Length | 57.79 |
| F-Number | 1.44 |
| Angle of View | 20.52 |
| Image Height | 21.64 |
| Total Lens Length | 163.89 |
| BF | 39.99 |

Second State (Third Exemplary Embodiment)

| Unit mm | | | | |
|---|---|---|---|---|
| Surface Data | | | | |
| Surface Number | r | d | nd | vd |
| 1 | 65.463 | 8.89 | 1.83481 | 42.7 |
| 2 | 287.195 | 2.55 | | |
| 3 | 292.460 | 2.50 | 1.53172 | 48.8 |
| 4 | 36.503 | 15.80 | | |
| 5 | −59.042 | 2.50 | 1.68948 | 31.0 |
| 6 | 100.395 | 10.02 | | |
| 7 | 135.925 | 9.83 | 1.77250 | 49.6 |
| 8 | −74.480 | (variable) | | |
| 9 | 280.199 | 3.57 | 1.80810 | 22.8 |
| 10 | −537.389 | 0.50 | | |
| 11 | 35.430 | 10.05 | 1.81600 | 46.6 |
| 12 | 1654.496 | 2.00 | 1.72047 | 34.7 |
| 13 | 28.181 | 9.85 | | |
| 14 (diaphragm) | ∞ | (variable) | | |
| 15 | −34.362 | 1.80 | 1.65412 | 39.7 |
| 16 | 126.775 | 0.00 | | |
| 17 | 52.735 | 7.33 | 1.81600 | 46.6 |
| 18 | −62.749 | 1.40 | | |
| 19 | −95.382 | 6.10 | 1.59522 | 67.7 |
| 20 | −33.833 | 1.80 | 1.69895 | 30.1 |
| 21 | −2643.237 | 5.11 | | |
| 22 | 95.305 | 5.54 | 1.77250 | 49.5 |
| 23* | −76.576 | (variable) | | |
| 24 | ∞ | 2.50 | 1.51633 | 64.1 |
| 25 | ∞ | 0.85 | | |
| Image Plane | ∞ | | | |

Aspherical Surface Data $23^{rd}$ Surface

K = 0.00000e+000    A4 = 4.72668e-006    A6 = −1.93156e-010    A8 = 3.88955e-012

| Focal Length | 58.00 |
|---|---|
| F-Number | 1.44 |
| Angle of View | 20.46 |
| Image Height | 21.64 |
| Total Lens Length | 164.63 |
| BF | 0.85 |

TABLE 1

| | First State | | | Second State | | |
|---|---|---|---|---|---|---|
| | Focusing on Object at Infinity | Image Magnification −0.02 | Image Magnification −0.12 | Focusing on Object at Infinity | Image Magnification −0.02 | Image Magnification −0.12 |
| d8 | 5.52 | 4.93 | 1.36 | 5.00 | 4.44 | 0.95 |
| d14 | 11.23 | 10.48 | 6.46 | 11.76 | 10.95 | 6.78 |
| d23 | 39.99 | 41.34 | 48.92 | 37.38 | 38.75 | 46.41 |

Next, the optical system LA according to the fourth exemplary embodiment will be described.

FIG. 9 is a cross-sectional view illustrating the optical system LA according to the fourth exemplary embodiment at the time of focusing on an object at infinity.

The optical system LA according to the present exemplary embodiment is a zoom lens including first to eighth lens units G1 to G8 disposed in this order from the object side to the image side. The first lens unit G1 has positive refractive power. The second lens unit G2 has negative refractive power. The third lens unit G3 has positive refractive power. The fourth lens unit G4 has positive refractive power. The fifth lens unit G5 has negative refractive power. The sixth lens unit G6 has positive refractive power. The seventh lens unit G7 has positive refractive power. The eighth lens unit G8 has negative refractive power.

In the present exemplary embodiment, the fifth lens unit G5 and the seventh lens unit G7 are moved at the time of focusing on a short distance from infinity. The fifth lens unit G5 corresponds to the first focus lens unit 103 in FIG. 1. The seventh lens unit G7 corresponds to the second focus lens unit 104 in FIG. 1.

Figure 9A:
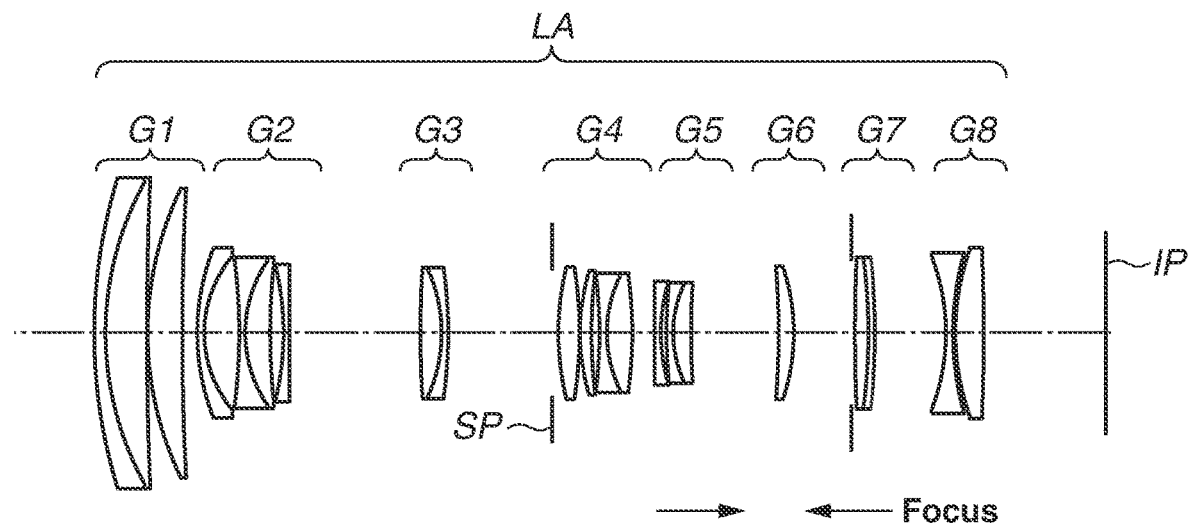
FIGS. 9A, 9B, and 9C are cross-sectional views illustrating the optical system according to a fourth exemplary embodiment in the case in which no optical element is disposed on the object side of the image plane.
Figure 9B:
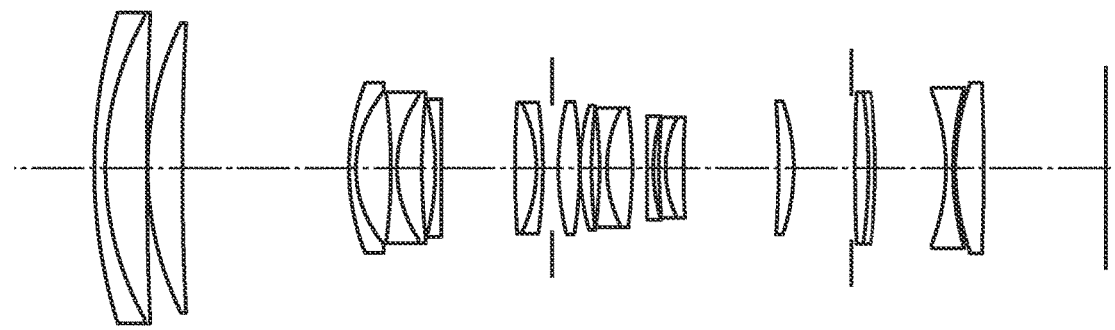
Figure 9C:
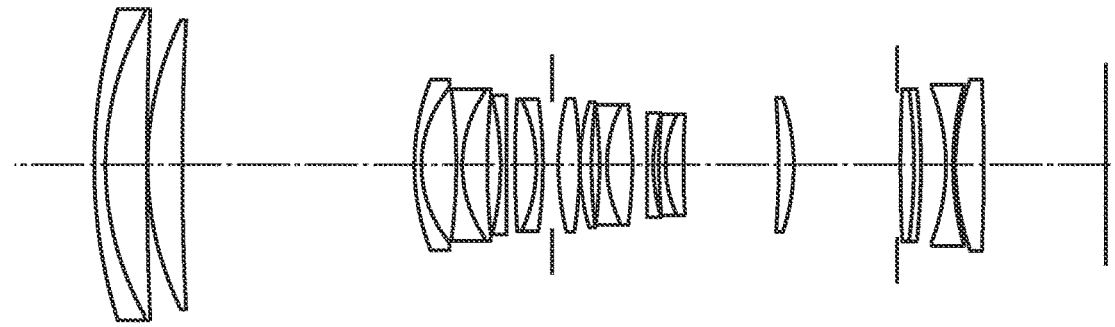

FIGS. 9A, 9B, and 9C are cross-sectional views illustrating the optical system LA at a wide angle end, an intermediate zoom position, and a telephoto end, respectively, in the first state.

In the cross-sectional views in FIGS. 9A, 9B, and 9C, no optical element is disposed between the optical system LA and the image plane IP. In the present exemplary embodiment, the state in which no optical element is disposed between the optical system LA and the image plane IP is referred to as the first state. Further, the arrangement of the fifth lens unit G5 and the seventh lens unit G7 focusing on an object at infinity in the first state is referred to as the first arrangement.

Figure 10A:
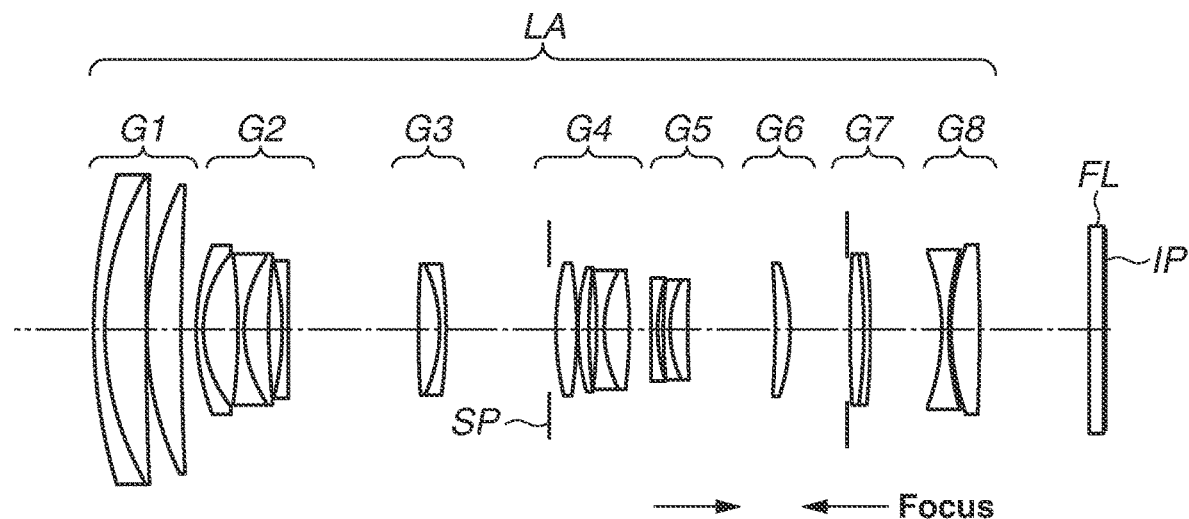
FIGS. 10A, 10B, and 10C are cross-sectional views illustrating the optical system according to the fourth exemplary embodiment in the case in which the optical element is disposed on the object side of the image plane.
Figure 10B:
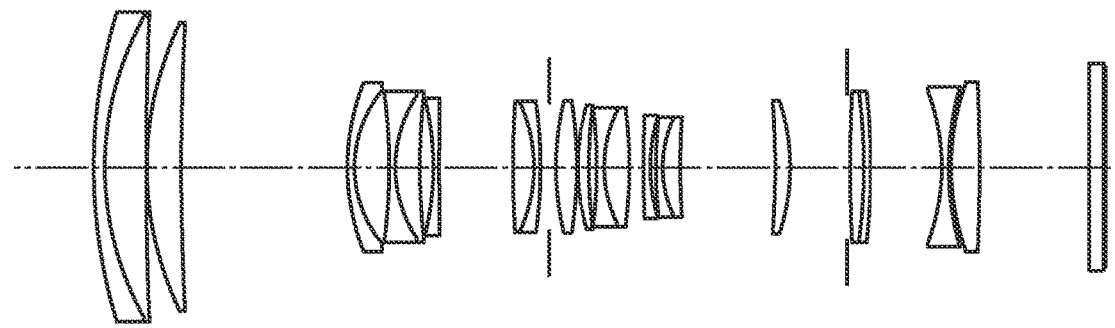
Figure 10C:
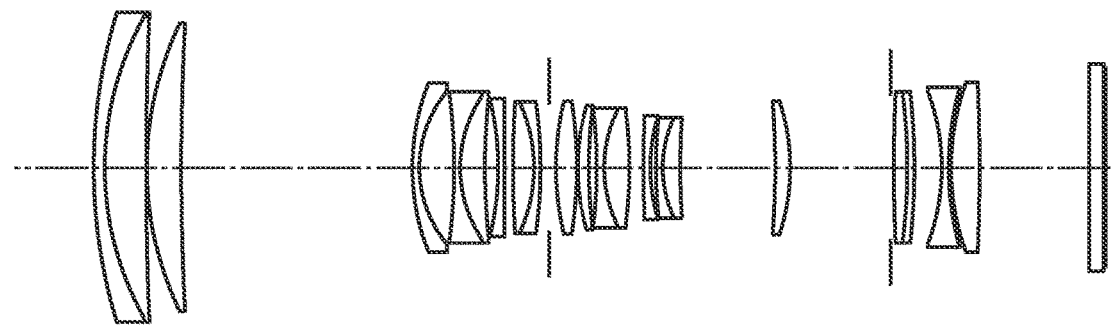

FIGS. 10A, 10B, and 10C are cross-sectional views illustrating the focusing on an object at infinity in the case in which the optical element FL is disposed between the optical system LA and the image plane IP, according to the present exemplary embodiment. The optical element FL corresponds to the optical element 207 in FIG. 1. In the present exemplary embodiment, the state in which the optical element FL is disposed between the optical system LA and the image plane IP is referred to as the second state. Further, the arrangement of the fifth lens unit G5 and seventh lens unit G7 focusing on infinity in the second state is referred to as the second arrangement.

In the second arrangement, the fifth lens unit G5 and the seventh lens unit G7 are both disposed closer to the object side than in the first arrangement.

As described above, although the focusing distance is the same, the amount of aberration in the optical system LA is changeable by changing the arrangement of the fifth lens unit G5 and the seventh lens unit G7 according to the optical element FL disposed between the optical system LA and the image plane IP. In this way, fluctuations in the amount of aberration and defocusing that are caused by the optical element FL disposed between the optical system LA and the image plane IP are both reduced.

FIGS. 10A, 10B, and 10C are cross-sectional views illustrating the optical system LA at the wide angle end, the intermediate zoom position, and the telephoto end in the second state.

In the present exemplary embodiment, the fifth lens unit G5 is moved to the image side and the seventh lens unit G7 is moved to the object side in the focusing from infinity to a short distance regardless of whether the optical element FL is present or absent. Specifically, in the focusing from infinity to a short distance, the fifth lens unit G5 and the seventh lens unit G7 are moved to reduce the distance between the fifth lens unit G5 and the seventh lens unit G7.

FIGS. 11A to 16C are aberration diagrams of the optical system LA according to the present exemplary embodiment.

Figure 11A:
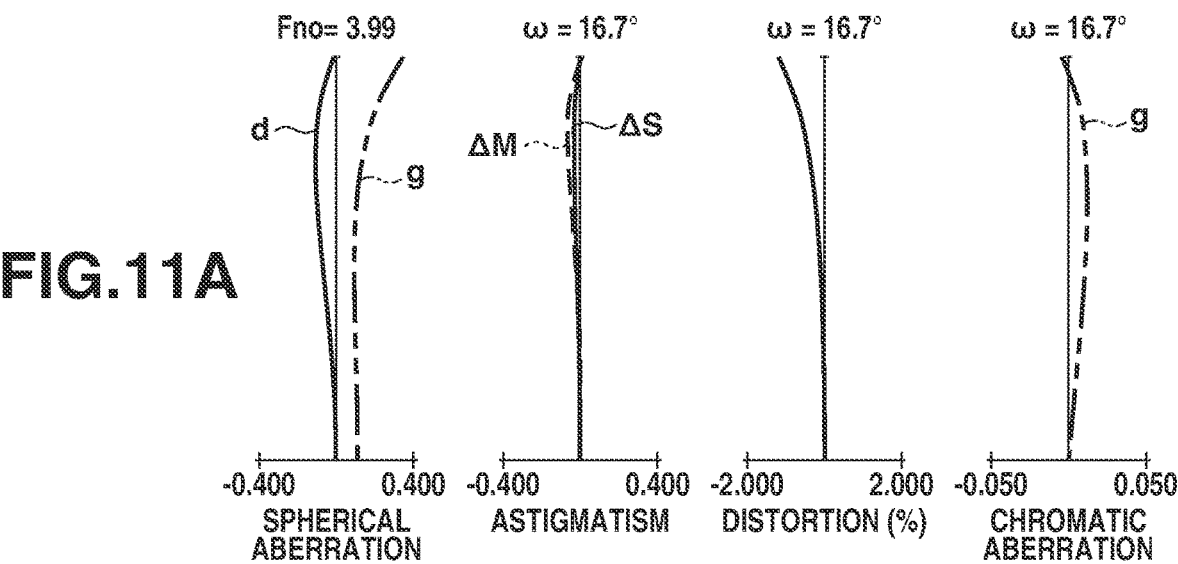
FIGS. 11A, 11B, and 11C are aberration diagrams of the optical system according to the fourth exemplary embodiment at a wide angle end in the case in which no optical element is disposed on the object side of the image plane.
Figure 11B:
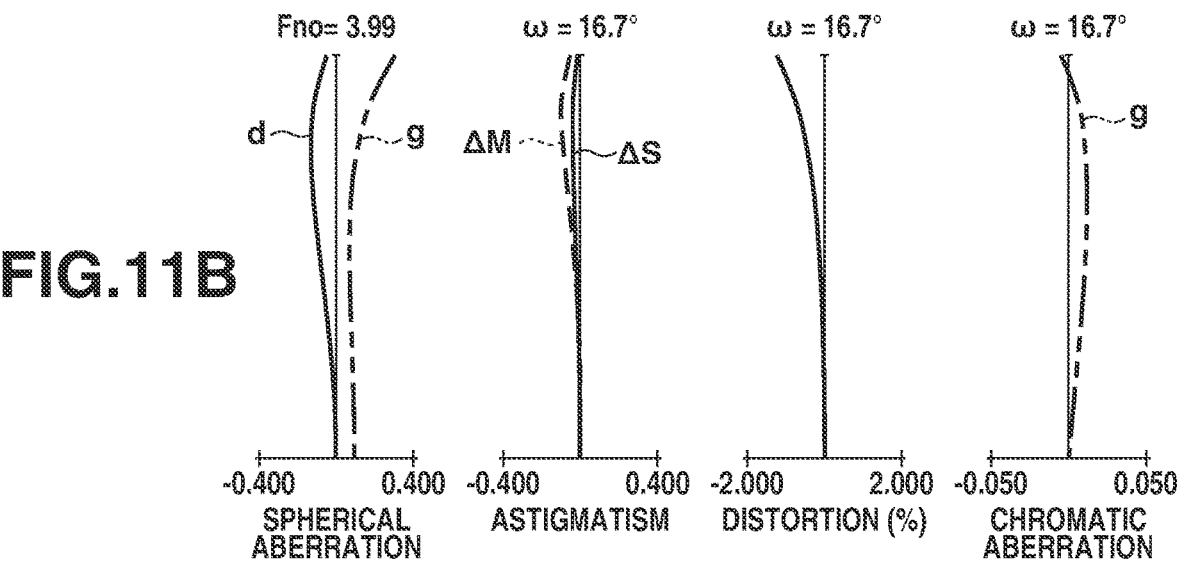
Figure 11C:
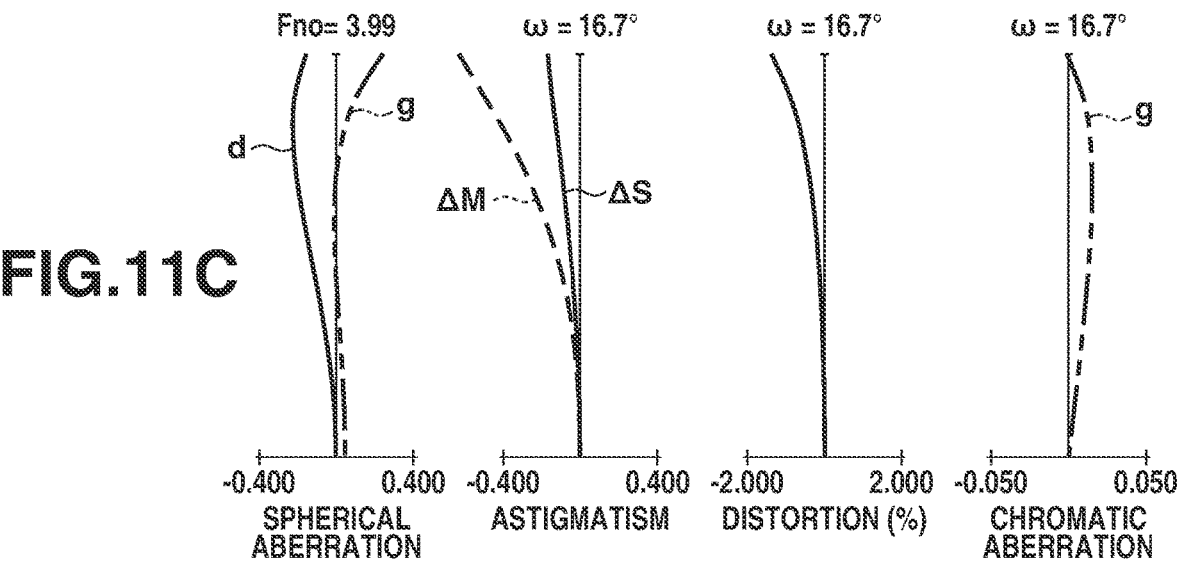

FIGS. 11A, 11B, and 11C are the aberration diagrams of the optical system LA in the first state and at the wide angle end in the focusing on an object at infinity in the case in which the imaging magnification is −0.02 and in the case in which the imaging magnification is −0.12.

Figure 12A:
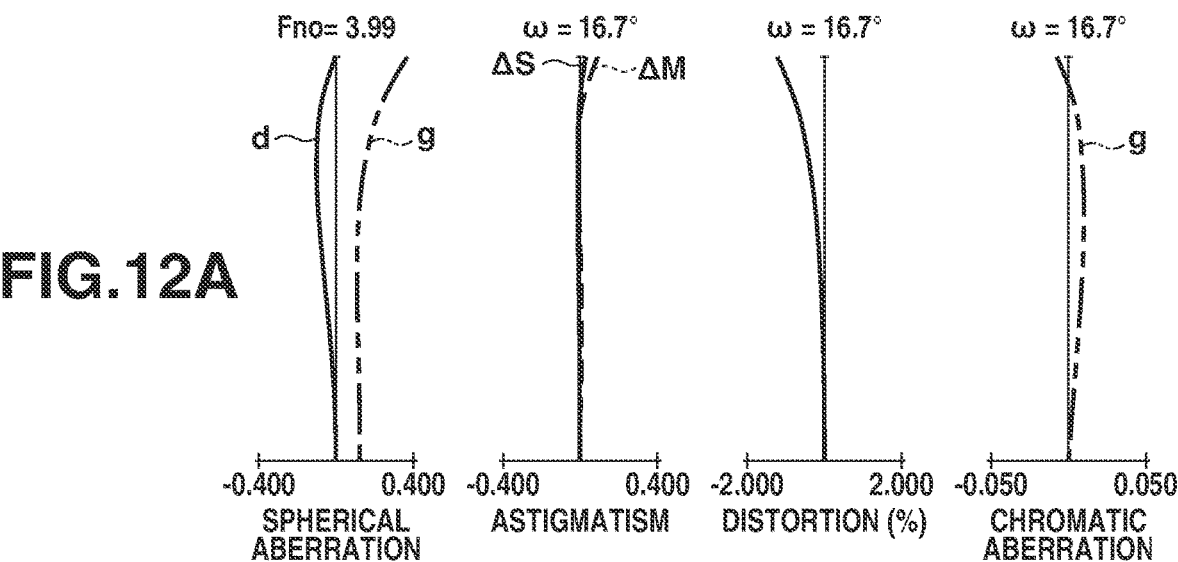
FIGS. 12A, 12B, and 12C are aberration diagrams of the optical system according to the fourth exemplary embodiment at the wide angle end in the case in which the optical element is disposed on the object side of the image plane.
Figure 12B:
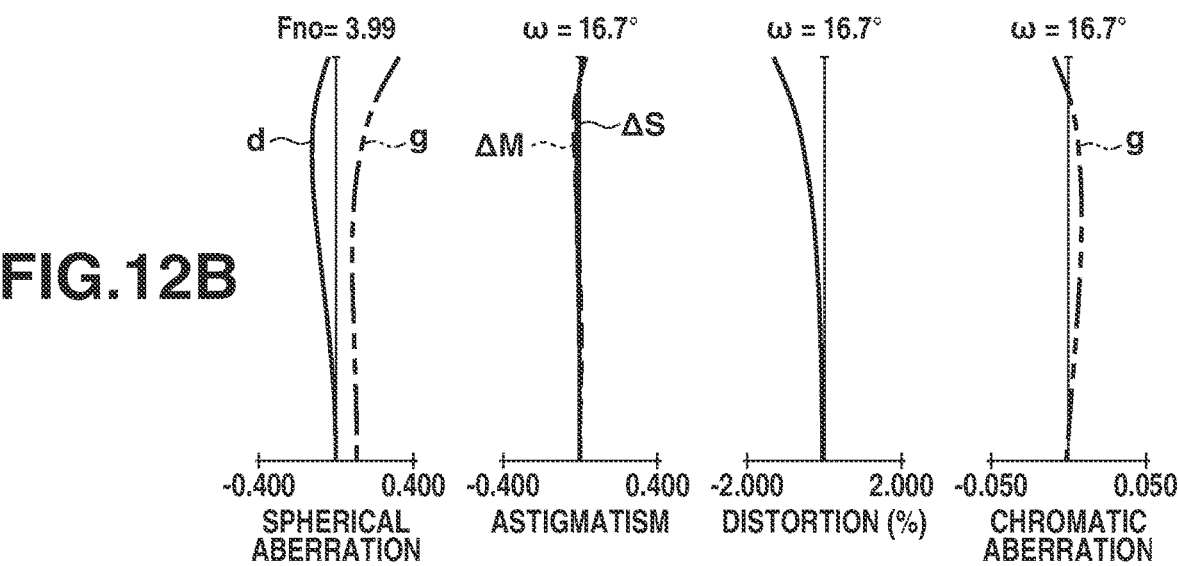
Figure 12C:
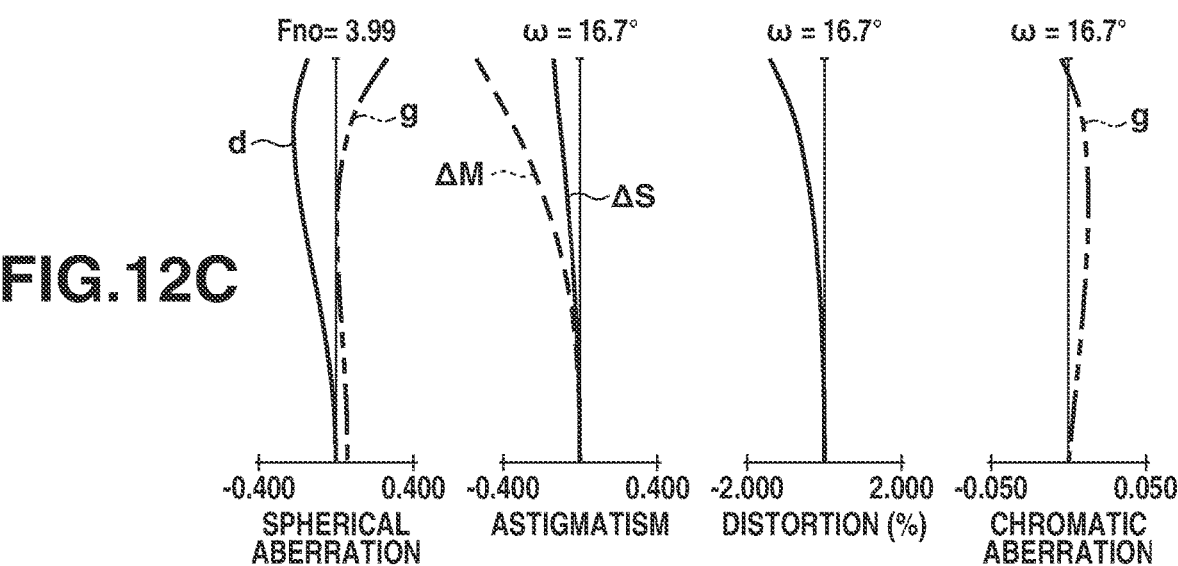

FIGS. 12A, 12B, and 12C are the aberration diagrams of the optical system LA in the second state and at the wide angle end in the focusing on an object at infinity in the case in which the imaging magnification is −0.02 and in the case in which the imaging magnification is −0.12.

Figure 13A:
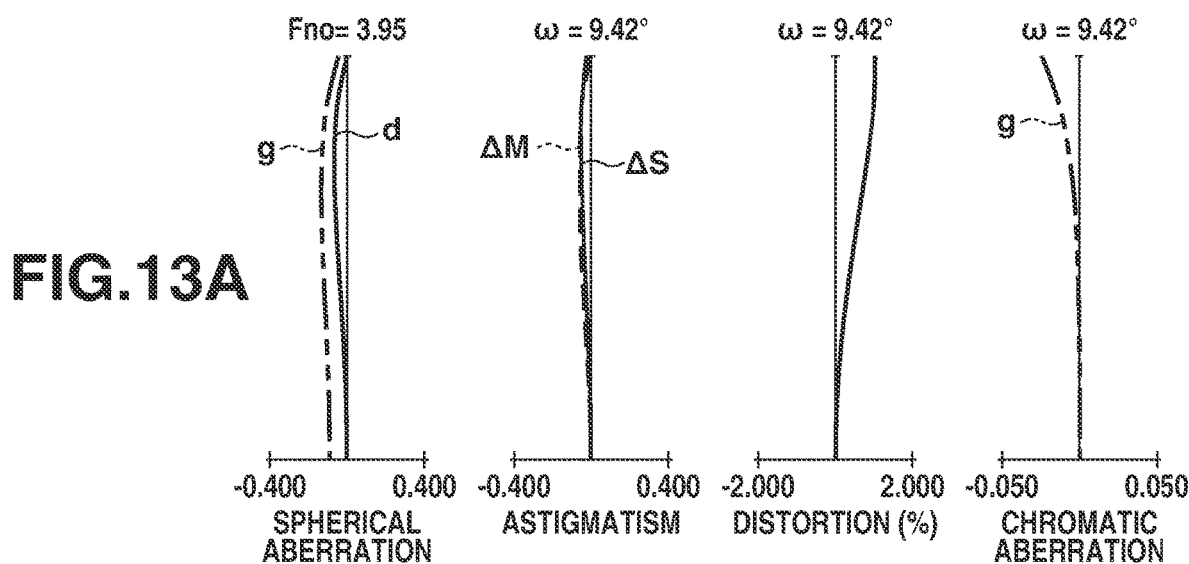
FIGS. 13A, 13B, and 13C are aberration diagrams of the optical system according to the fourth exemplary embodiment at an intermediate zoom position in the case in which no optical element is disposed on the object side of the image plane.
Figure 13B:
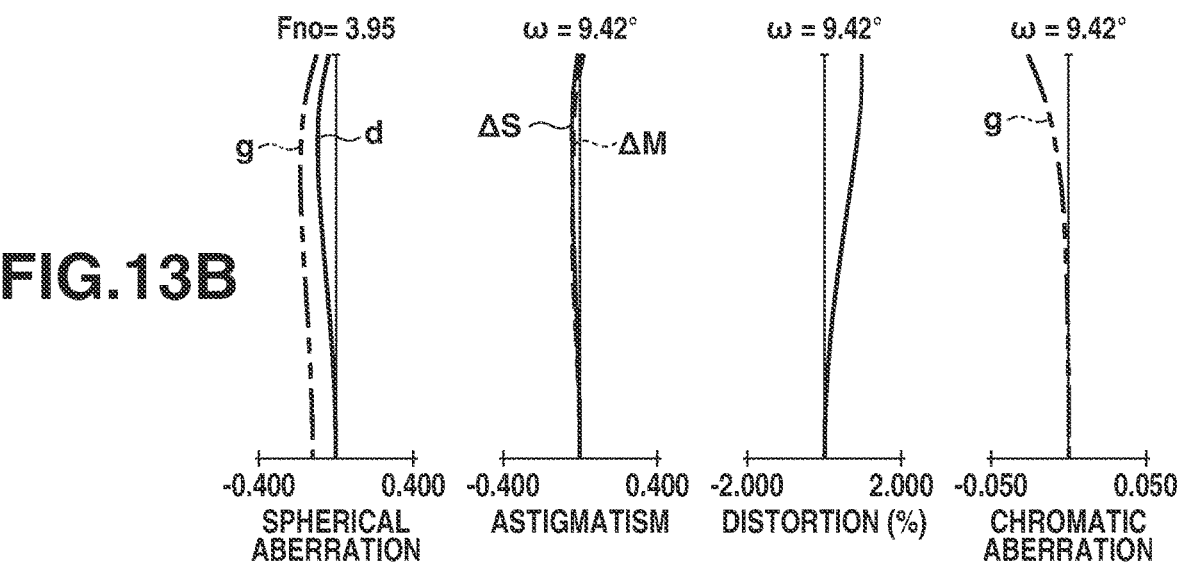
Figure 13C:
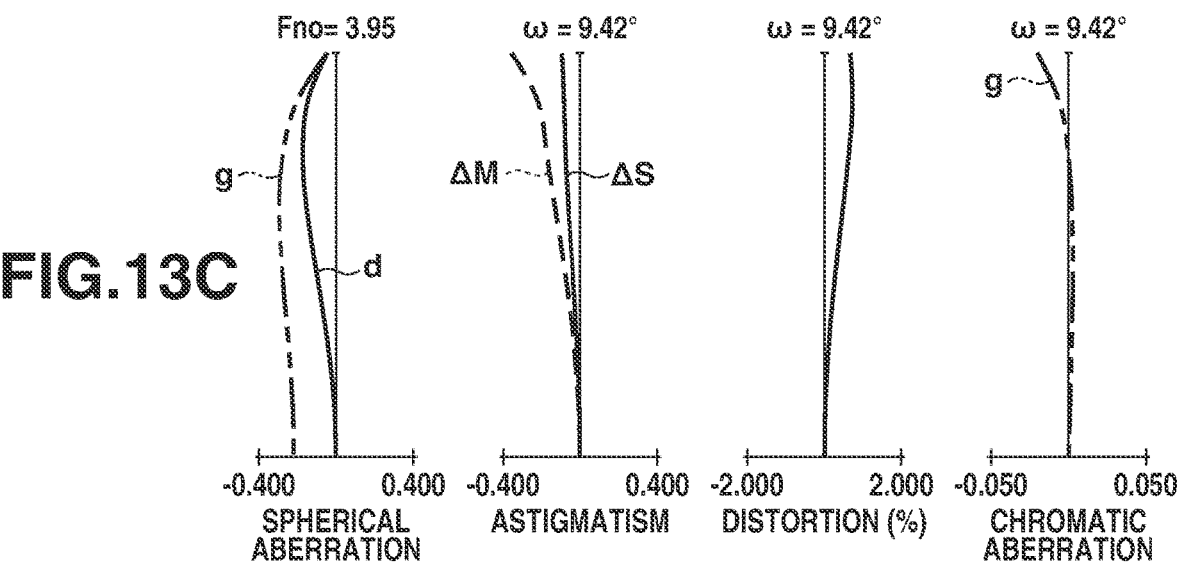

FIGS. 13A, 13B, and 13C are the aberration diagrams of the optical system LA in the first state and at the intermediate zoom position in the focusing on an object at infinity in the case in which the imaging magnification is −0.02 and in the case in which the imaging magnification is −0.16.

Figure 14A:
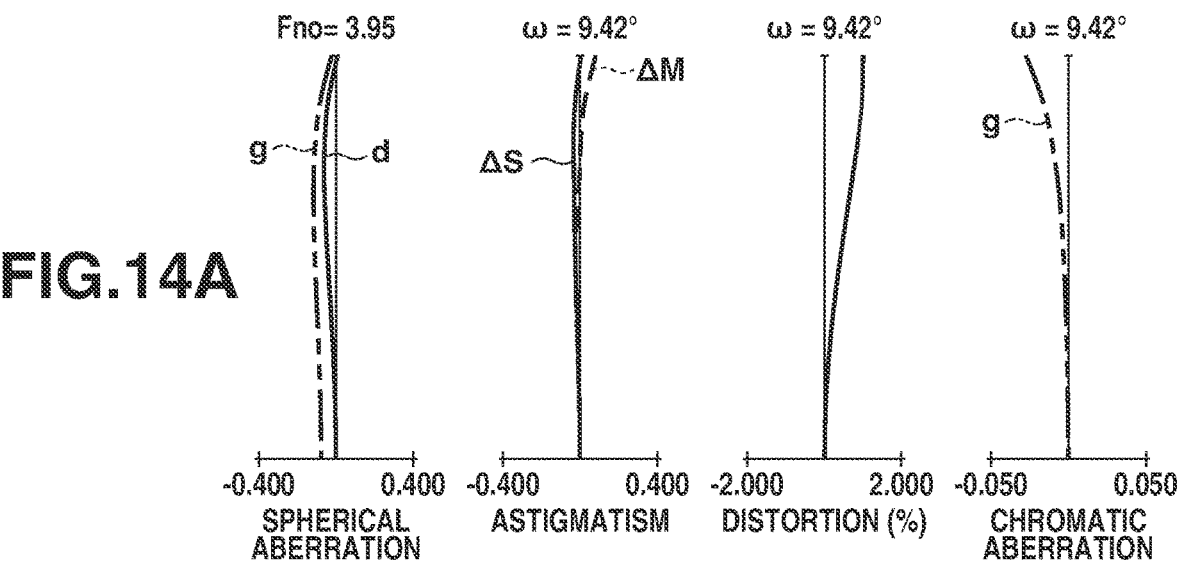
FIGS. 14A, 14B, and 14C are aberration diagrams of the optical system according to the fourth exemplary embodiment at the intermediate zoom position in the case in which the optical element is disposed on the object side of the image plane.
Figure 14B:
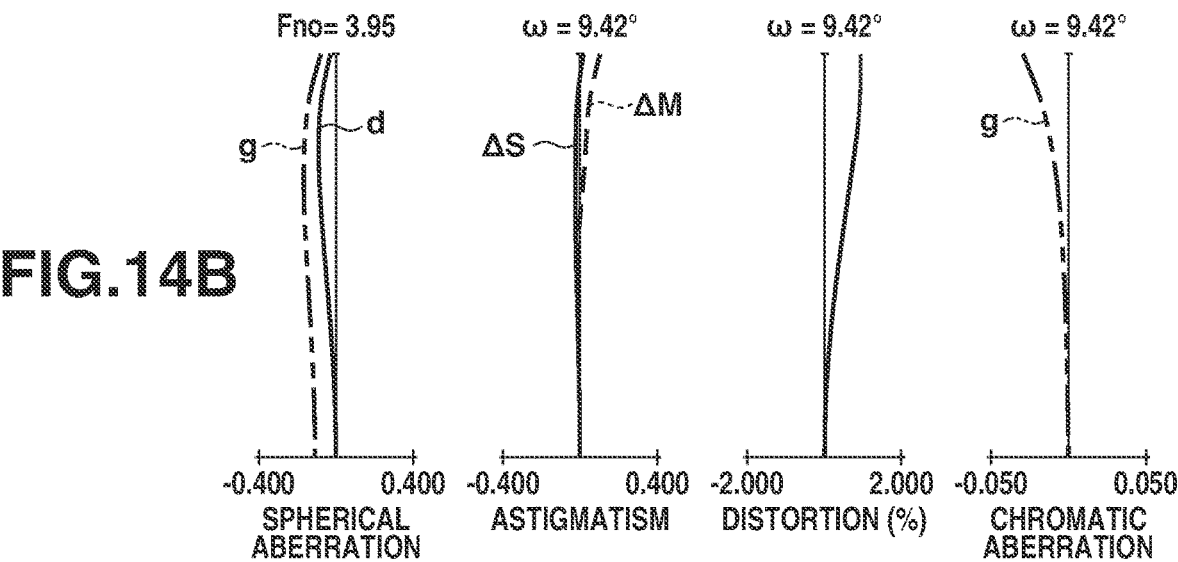
Figure 14C:
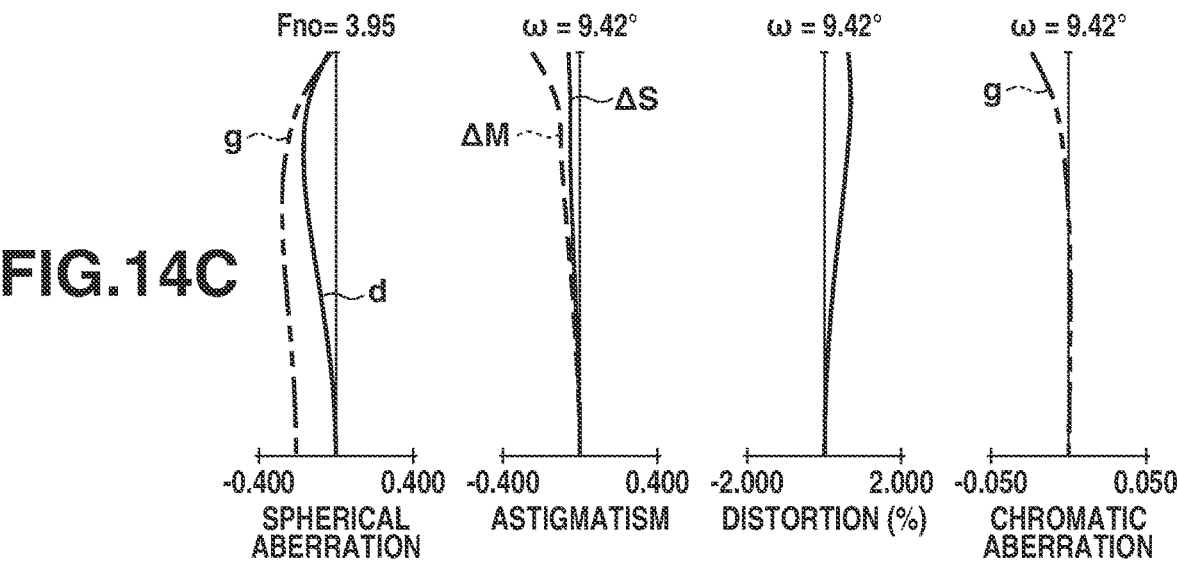

FIGS. 14A, 14B, and 14C are the aberration diagrams of the optical system LA in the second state and at the intermediate zoom position in the focusing on an object at infinity in the case in which the imaging magnification is −0.02 and in the case in which the imaging magnification is −0.16.

Figure 15A:
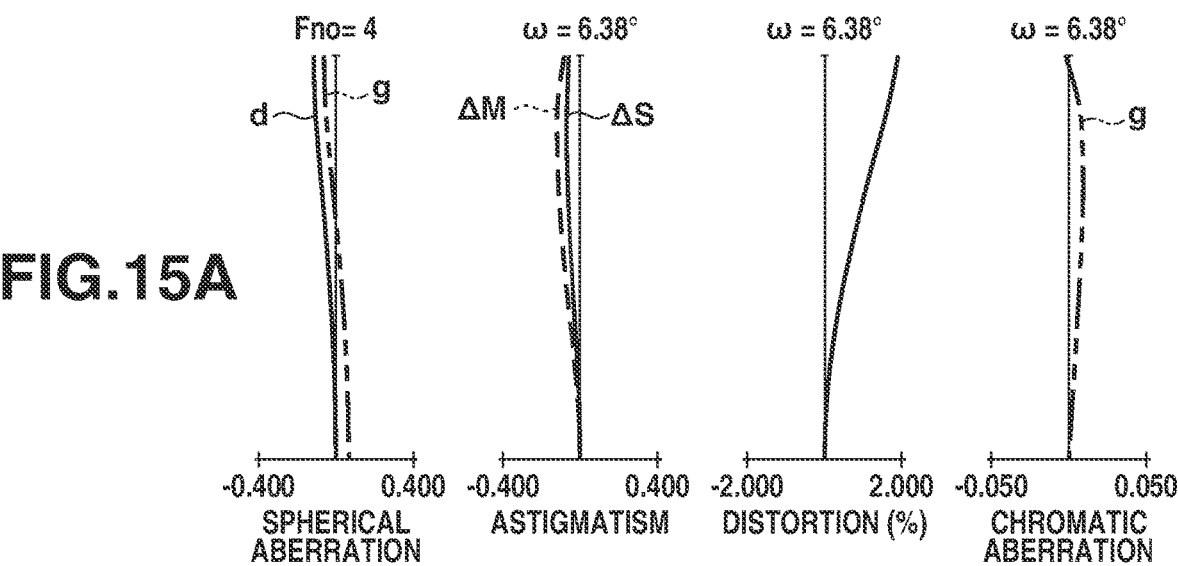
FIGS. 15A, 15B, and 15C are aberration diagrams of the optical system according to the fourth exemplary embodiment at a telephoto end the fourth exemplary embodiment at a telephoto end in the case in which no optical element is disposed on the object side of the image plane.
Figure 15B:
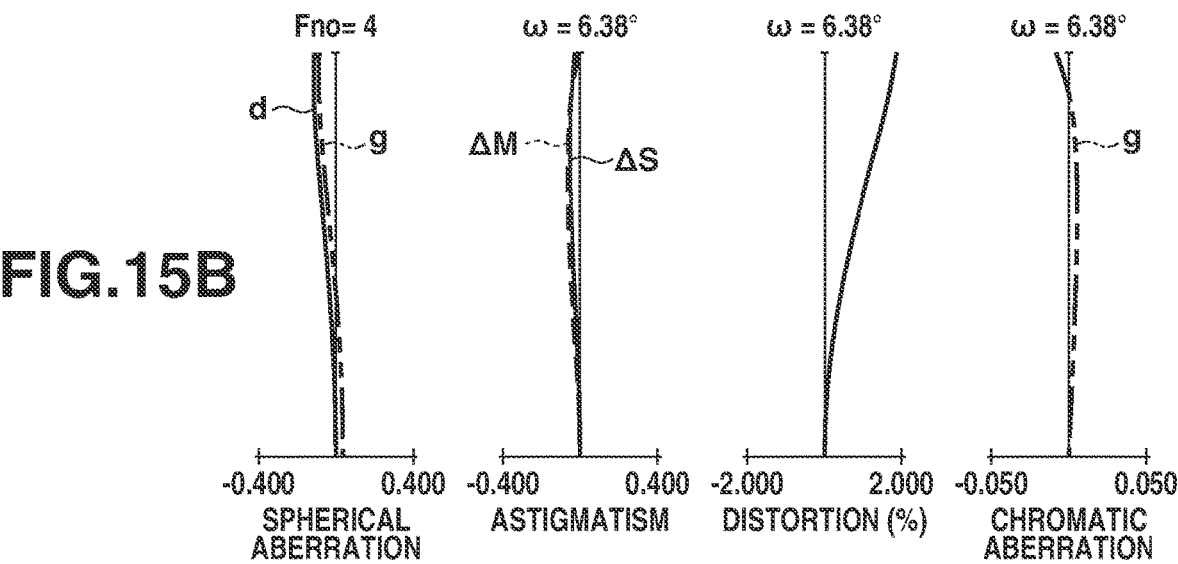
Figure 15C:
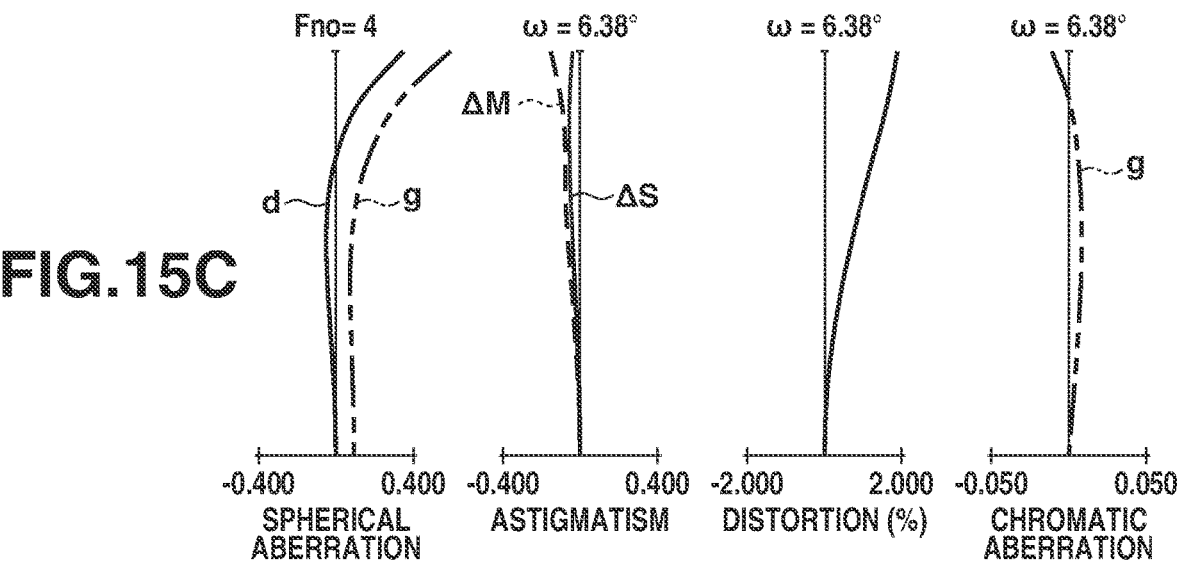

FIGS. 15A, 15B, and 15C are the aberration diagrams of the optical system LA in the first state and at the telephoto end in the focusing on an object at infinity in the case in which the imaging magnification is −0.02 and in the case in which the imaging magnification is −0.25.

Figure 16A:
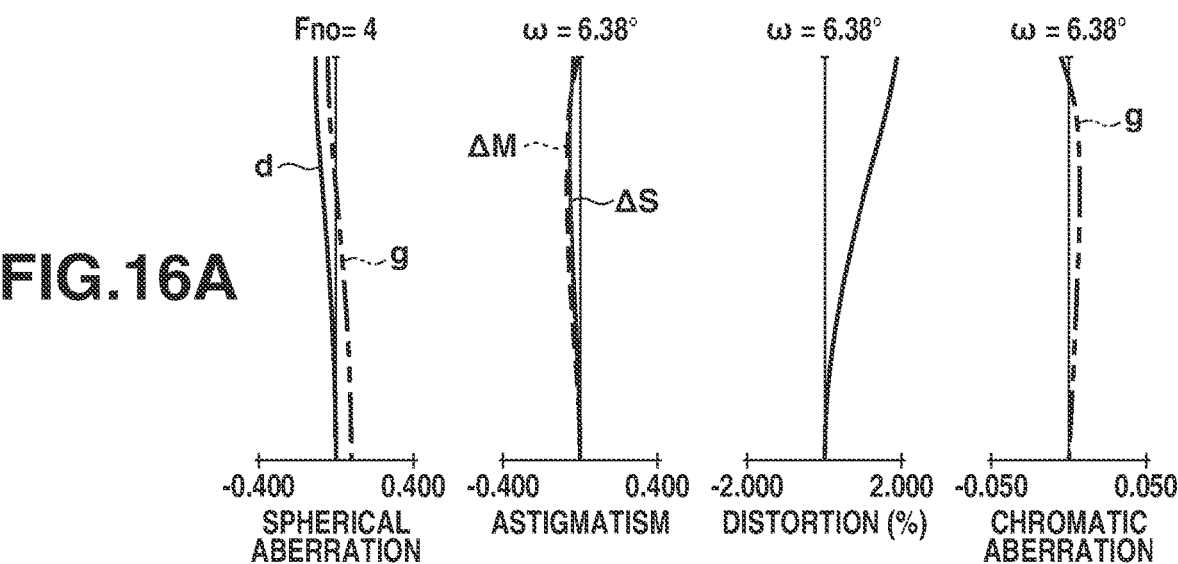
FIGS. 16A, 16B, and 16C are aberration diagrams illustrating the optical system according to the fourth exemplary embodiment at the telephoto end in the case in which the optical element is disposed on the object side of the image plane.
Figure 16B:
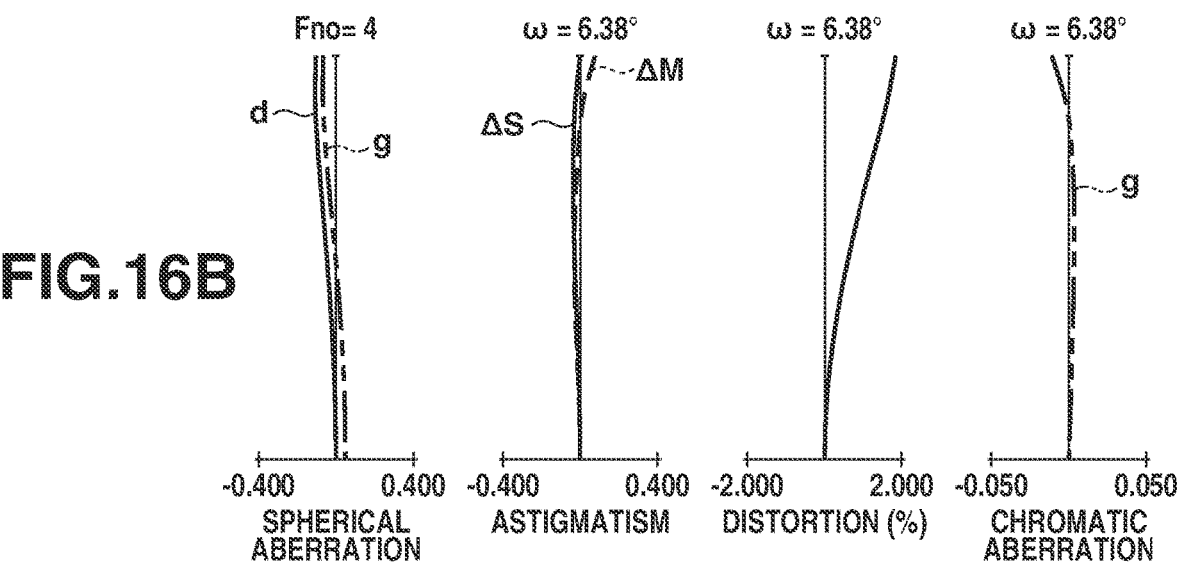
Figure 16C:
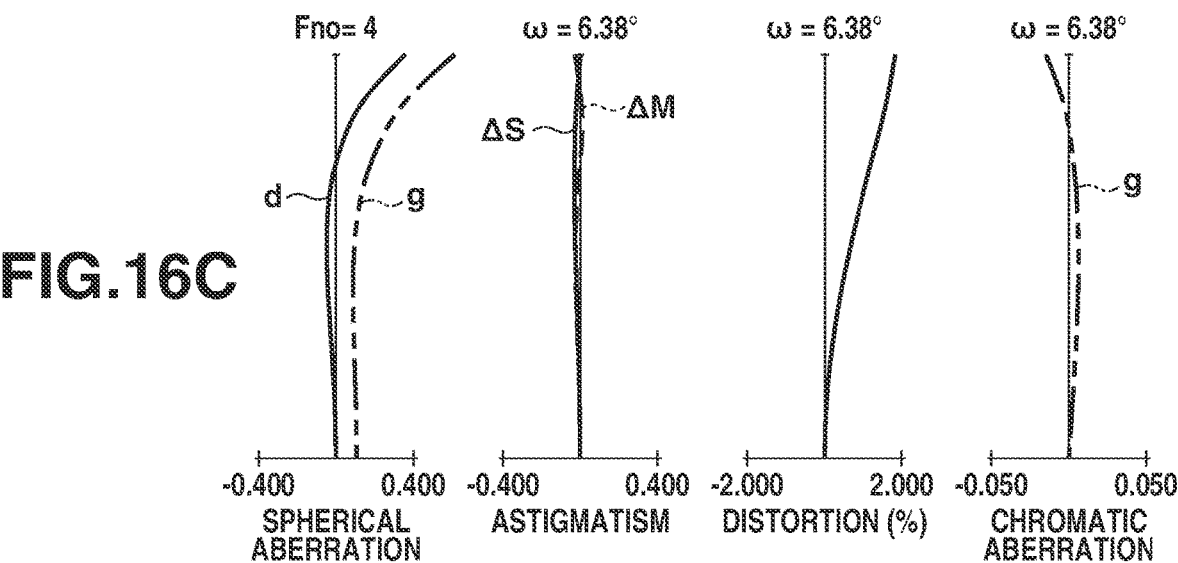

FIGS. 16A, 16B, and 16C are the aberration diagrams of the optical system LA in the second state and at the telephoto end in the focusing on an object at infinity in the case in which the imaging magnification is −0.02 and in the case in which the imaging magnification is −0.25.

Next, numerical examples of the optical system LA according to the present exemplary embodiment will be described below. The numerical examples illustrate the first state and the second state of the optical system LA.

The distances specified as "(variable)" in the surface data are collectively specified in Tables 2, 3, and 4. Table 2 shows surface distance data with respect to the wide angle end. Table 3 shows variable surface distance data with respect to the intermediate zoom position. Table 4 shows variable surface distance data with respect to the telephoto end.

First State (Fourth Exemplary Embodiment)

| Unit mm | | | | |
| --- | --- | --- | --- | --- |
| Surface Data | | | | |
| Surface Number | r | d | nd | vd |
| 1 | 113.024 | 2.40 | 1.72047 | 34.7 |
| 2 | 66.442 | 8.81 | 1.43875 | 94.7 |
| 3 | 757.319 | 0.15 | | |
| 4 | 71.175 | 7.36 | 1.49700 | 81.5 |
| 5 | 583.178 | (variable) | | |
| 6 | 49.469 | 1.50 | 1.73800 | 32.3 |
| 7 | 25.786 | 7.41 | | |
| 8 | −123.349 | 1.30 | 1.49700 | 81.5 |
| 9 | 27.758 | 5.28 | 1.85478 | 24.8 |
| 10 | 145.829 | 2.84 | | |
| 11 | −61.094 | 1.25 | 1.80100 | 35.0 |

-continued

Unit mm

| | | | | |
|---|---|---|---|---|
| 12 | 1811.368 | (variable) | | |
| 13 | 228.227 | 4.50 | 1.69680 | 55.5 |
| 14 | −33.026 | 1.40 | 1.83481 | 42.7 |
| 15 | −99.451 | (variable) | | |
| 16 (diaphragm) | ∞ | 1.40 | | |
| 17 | 59.754 | 4.48 | 1.69895 | 30.1 |
| 18 | −91.806 | 0.20 | | |
| 19 | 45.190 | 2.47 | 1.69350 | 50.8 |
| 20 | 108.415 | 1.70 | | |
| 21 | −103.468 | 1.60 | 1.80518 | 25.4 |
| 22 | 28.003 | 5.38 | 1.53775 | 74.7 |
| 23 | −92.070 | (variable) | | |
| 24 | 1449.551 | 1.40 | 1.85478 | 24.8 |
| 25 | 38.266 | 1.22 | | |
| 26 | 117.731 | 1.40 | 1.62230 | 53.2 |
| 27 | 24.933 | 3.77 | 1.80810 | 22.8 |
| 28 | 160.424 | (variable) | | |
| 29 | −183.068 | 3.20 | 1.51633 | 64.1 |
| 30 | −44.873 | (variable) | | |
| 31 | ∞ | 0.70 | | |
| 32 | 340.273 | 2.89 | 1.67300 | 38.1 |
| 33 | −122.021 | 1.50 | 1.85026 | 32.3 |
| 34 | −145.605 | (variable) | | |
| 35 | −46.118 | 1.50 | 1.83400 | 37.3 |
| 36 | 63.000 | 0.50 | | |
| 37 | 53.024 | 6.05 | 1.88300 | 40.8 |
| 38 | −463.304 | (variable) | | |
| Image Plane | ∞ | | | |

Various Data

Zoom Ratio 2.69

| | | | |
|---|---|---|---|
| Focal Length | 72.20 | 130.45 | 194.20 |
| F-Number | 4.00 | 3.95 | 4.00 |
| Angle of View | 16.68 | 9.42 | 6.36 |
| Image Height | 21.64 | 21.64 | 21.64 |
| Total Lens Length | 215.54 | 215.54 | 215.54 |
| BF | 25.98 | 25.98 | 25.98 |

Zoom Lens Unit Data

| Unit | Starting Surface | Focal Length | Configuration Length | Front-Side Principal Point Position | Rear-Side Principal Point Position |
|---|---|---|---|---|---|
| 1 | 1 | 130.99 | 18.72 | 4.32 | −8.37 |
| 2 | 6 | −39.24 | 19.58 | 8.28 | −6.17 |
| 3 | 13 | 138.10 | 5.90 | 2.44 | −1.00 |
| 4 | 16 | 56.01 | 17.22 | 0.74 | −11.00 |
| 5 | 24 | −71.98 | 7.78 | 0.70 | −4.17 |
| 6 | 29 | 114.22 | 3.20 | 2.78 | 0.68 |
| 7 | 31 | 157.55 | 5.09 | 2.64 | −0.61 |
| 8 | 35 | −81.27 | 8.05 | −1.61 | −6.23 |

Second State (Fourth Exemplary Embodiment)

Unit mm

Surface Data

| Surface Number | r | d | nd | vd |
|---|---|---|---|---|
| 1 | 113.024 | 2.40 | 1.72047 | 34.7 |
| 2 | 66.442 | 8.81 | 1.43875 | 94.7 |
| 3 | 757.319 | 0.15 | | |
| 4 | 71.175 | 7.36 | 1.49700 | 81.5 |
| 5 | 583.178 | (variable) | | |
| 6 | 49.469 | 1.50 | 1.73800 | 32.3 |
| 7 | 25.786 | 7.41 | | |
| 8 | −123.349 | 1.30 | 1.49700 | 81.5 |
| 9 | 27.758 | 5.28 | 1.85478 | 24.8 |
| 10 | 145.829 | 2.84 | | |
| 11 | −61.094 | 1.25 | 1.80100 | 35.0 |
| 12 | 1811.368 | (variable) | | |
| 13 | 228.227 | 4.50 | 1.69680 | 55.5 |
| 14 | −33.026 | 1.40 | 1.83481 | 42.7 |
| 15 | −99.451 | (variable) | | |
| 16 (diaphragm) | ∞ | 1.40 | | |
| 17 | 59.754 | 4.48 | 1.69895 | 30.1 |
| 18 | −91.806 | 0.20 | | |
| 19 | 45.190 | 2.47 | 1.69350 | 50.8 |
| 20 | 108.415 | 1.70 | | |
| 21 | −103.468 | 1.60 | 1.80518 | 25.4 |
| 22 | 28.003 | 5.38 | 1.53775 | 74.7 |
| 23 | −92.070 | (variable) | | |
| 24 | 1449.551 | 1.40 | 1.85478 | 24.8 |
| 25 | 38.266 | 1.22 | | |
| 26 | 117.731 | 1.40 | 1.62230 | 53.2 |
| 27 | 24.933 | 3.77 | 1.80810 | 22.8 |
| 28 | 160.424 | (variable) | | |
| 29 | −183.068 | 3.20 | 1.51633 | 64.1 |
| 30 | −44.873 | (variable) | | |
| 31 | ∞ | 0.70 | | |
| 32 | 340.273 | 2.89 | 1.67300 | 38.1 |
| 33 | −122.021 | 1.50 | 1.85026 | 32.3 |
| 34 | −145.605 | (variable) | | |
| 35 | −46.118 | 1.50 | 1.83400 | 37.3 |
| 36 | 63.000 | 0.50 | | |
| 37 | 53.024 | 6.05 | 1.88300 | 40.8 |
| 38 | −463.304 | (variable) | | |
| 39 | ∞ | 3.00 | 1.51633 | 64.1 |
| 40 | ∞ | 0.50 | | |
| Image Plane | ∞ | | | |

Various Data

Zoom Ratio 2.69

| | | | |
|---|---|---|---|
| Focal Length | 72.13 | 130.44 | 193.60 |
| F-Number | 3.99 | 3.95 | 4.00 |
| Angle of View | 16.70 | 9.42 | 6.38 |
| Image Height | 21.64 | 21.64 | 21.64 |
| Total Lens Length | 216.56 | 216.56 | 216.56 |
| BF | 0.50 | 0.50 | 0.50 |

Zoom Lens Unit Data

| Unit | Starting Surface | Focal Length | Configuration Length | Front-Side Principal Point Position | Rear-Side Principal Point Position |
|---|---|---|---|---|---|
| 1 | 1 | 130.99 | 18.72 | 4.32 | −8.37 |
| 2 | 6 | −39.24 | 19.58 | 8.28 | −6.17 |
| 3 | 13 | 138.10 | 5.90 | 2.44 | −1.00 |
| 4 | 16 | 56.01 | 17.22 | 0.74 | −11.00 |
| 5 | 24 | −71.98 | 7.78 | 0.70 | −4.17 |
| 6 | 29 | 114.22 | 3.20 | 2.78 | 0.68 |
| 7 | 31 | 157.55 | 5.09 | 2.64 | −0.61 |
| 8 | 35 | −81.27 | 34.55 | −1.61 | −31.71 |

TABLE 2

| | First State | | | Second State | | |
|---|---|---|---|---|---|---|
| | Focusing on Object at Infinity | Image Magnification −0.02 | Image Magnification −0.12 | Focusing on Object at Infinity | Image Magnification −0.02 | Image Magnification −0.12 |
| d5 | 3.20 | 3.20 | 3.20 | 3.20 | 3.20 | 3.20 |
| d12 | 28.00 | 28.00 | 28.00 | 28.00 | 28.00 | 28.00 |
| d15 | 22.05 | 22.05 | 22.05 | 22.05 | 22.05 | 22.05 |
| d23 | 4.71 | 5.05 | 7.79 | 4.65 | 4.98 | 7.73 |
| d28 | 18.65 | 18.31 | 15.57 | 18.71 | 18.38 | 15.63 |
| d30 | 12.29 | 11.32 | 6.08 | 12.12 | 11.15 | 5.91 |
| d34 | 15.11 | 16.08 | 21.32 | 15.27 | 16.25 | 21.48 |
| d38 | 25.98 | 25.98 | 25.98 | 23.50 | 23.50 | 23.50 |

TABLE 3

| | First State | | | Second State | | |
|---|---|---|---|---|---|---|
| | Focusing on Object at Infinity | Image Magnification −0.02 | Image Magnification −0.16 | Focusing on Object at Infinity | Image Magnification −0.02 | Image Magnification −0.16 |
| d5 | 35.60 | 35.60 | 35.60 | 35.60 | 35.60 | 35.60 |
| d12 | 15.74 | 15.74 | 15.74 | 15.74 | 15.74 | 15.74 |
| d15 | 1.91 | 1.91 | 1.91 | 1.91 | 1.91 | 1.91 |
| d23 | 3.10 | 3.63 | 9.93 | 3.09 | 3.63 | 9.93 |
| d28 | 20.26 | 19.73 | 13.43 | 20.26 | 19.73 | 13.43 |
| d30 | 12.45 | 10.95 | 1.64 | 12.43 | 10.93 | 1.61 |
| d34 | 14.95 | 16.45 | 25.76 | 14.96 | 16.47 | 25.78 |
| d38 | 25.98 | 25.98 | 25.98 | 23.50 | 23.50 | 23.50 |

TABLE 4

| | First State | | | Second State | | |
|---|---|---|---|---|---|---|
| | Focusing on Object at Infinity | Image Magnification −0.02 | Image Magnification −0.25 | Focusing on Object at Infinity | Image Magnification −0.02 | Image Magnification −0.25 |
| d5 | 49.49 | 49.49 | 49.49 | 49.49 | 49.49 | 49.49 |
| d12 | 1.80 | 1.80 | 1.80 | 1.80 | 1.80 | 1.80 |
| d15 | 1.97 | 1.97 | 1.97 | 1.97 | 1.97 | 1.97 |
| d23 | 3.08 | 3.97 | 20.60 | 2.96 | 3.84 | 20.39 |
| d28 | 20.28 | 19.39 | 2.76 | 20.40 | 19.52 | 2.97 |
| d30 | 22.11 | 19.77 | 2.48 | 21.60 | 19.27 | 2.03 |
| d34 | 5.29 | 7.63 | 24.92 | 5.80 | 8.12 | 25.37 |
| d38 | 25.98 | 25.98 | 25.98 | 23.50 | 23.50 | 23.50 |

Further, Table 5 collectively shows various values of the optical systems LA according to the third and fourth exemplary embodiments described above.

TABLE 5

| | First Numerical Example | Second Numerical Example | | |
|---|---|---|---|---|
| | | Wide Angle End | Intermediate | Telephoto End |
| S1 | 0.210 | −2.264 | −2.294 | −2.084 |
| S2 | 0.790 | 0.811 | 0.808 | 0.618 |
| X1 | −0.526 | −0.061 | 0.01 | −0.123 |
| X2 | 0.526 | −0.169 | −0.012 | −0.511 |
| β | −0.120 | −0.124 | −0.163 | −0.243 |
| βi1 | 0.027 | 3.301 | 3.315 | 2.968 |
| βi2 | 0.458 | 0.764 | 0.765 | 0.826 |
| βj1 | 0.027 | 3.310 | 3.316 | 2.984 |
| βj2 | 0.458 | 0.763 | 0.757 | 0.724 |
| βi1r | 0.458 | 0.478 | 0.479 | 0.517 |
| βi2r | 1.000 | 1.396 | 1.396 | 1.396 |

TABLE 5-continued

| | First Numerical Example | Second Numerical Example | | |
|---|---|---|---|---|
| | | Wide Angle End | Intermediate | Telephoto End |
| Conditional Expression (1) | 0.000 | 0.000 | 0.000 | 0.000 |
| Conditional Expression (2) | −0.120 | −0.124 | −0.163 | −0.243 |
| Conditional Expression (3) | 1.000 | 0.999 | 1.011 | 1.136 |

While various exemplary embodiments and examples have been described, the present invention is not limited to the exemplary embodiments and the examples, and various combinations, modifications, and changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201416, filed Oct. 17, 2017, which is hereby incorporated by reference herein in its entirety.

What is claimed is:

1. A lens apparatus mountable on and removable from an image capturing apparatus including an image sensor, the lens apparatus comprising:
an optical system including a first focus lens unit and a second focus lens unit each being configured to move in loci different from each other in focusing; and
a lens control unit configured to control a position of the first focus lens unit and a position of the second focus lens unit,
wherein the lens control unit controls the position of the first focus lens unit and the position of the second focus lens unit based on the loci of the first focus lens unit and the second focus lens unit, the loci of the first focus lens unit and the second focus lens unit being determined according to information about an optical element disposed between the optical system and the image sensor,
wherein in a case where a configuration of the optical element between the optical system and the image sensor is in a first state, the lens control unit controls the position of the first focus lens unit and the position of the second focus lens unit such that the first focus lens unit and the second focus lens unit are arranged in a first arrangement to focus the optical system on a first subject distance, and
wherein in a case where the configuration of the optical element between the optical system and the image sensor is in a second state different from the first state, the lens control unit controls the position of the first focus lens unit and the position of the second focus lens unit such that the first focus lens unit and the second focus lens unit are arranged in a second arrangement different from the first arrangement to focus the optical system on the first subject distance,
wherein the following relationships are satisfied:

$$\left(\frac{S1}{|S1|}\right) \times \left(\frac{X1}{|X1|}\right) + \left(\frac{S2}{|S2|}\right) \times \left(\frac{X2}{|X2|}\right) = 0 \quad (1)$$

$S1 = (1-\beta i1^2) \times \beta i1r^2$, and $S2 = (1-\beta i2^2) \times \beta i2r^2$, where βi1 is a lateral magnification of the first focus lens unit in the first arrangement, βi1 is a lateral magnification of the second focus lens unit in the first arrangement, βi1r is a combined lateral magnification of a lens unit disposed closer to an image side than the first focus lens unit in the first arrangement, βi2r is a combined lateral magnification of a lens unit disposed closer to the image side than the second focus lens unit in the first arrangement, X1 is an amount of movement of the first focus lens unit changed from the first arrangement to the second arrangement, X2 is an amount of movement of the second focus lens unit changed from the first arrangement to the second arrangement.

2. The lens apparatus according to claim 1, wherein an amount of aberration in the optical system in the case where the first focus lens unit and the second focus lens unit are in the first arrangement is different from an amount of aberration in the optical system in the case where the first focus lens unit and the second focus lens unit are in the second arrangement.

3. The lens apparatus according to claim 1, wherein the following conditional expression is satisfied:

$$0.95 < (\beta i1 \times \beta i2)/(\beta j1 \times \beta j2) < 1.15$$

where βj1 is a lateral magnification of the first focus lens unit in the second arrangement, and βj2 lateral magnification of the second focus lens unit in the second arrangement.

4. The lens apparatus according to claim 1,
wherein the first subject distance is a shortest distance in a distance range in which the optical system is able to perform focusing, and
wherein the following conditional expression is satisfied:

$$\beta < -0.1$$

where β is a lateral magnification of the optical system at the shortest distance.

5. The lens apparatus according to claim 1,
wherein in the first state, the optical element is not disposed between the optical system and the image sensor, and
wherein in the second state, the optical element is disposed between the optical system and the image sensor.

6. The lens apparatus according to claim 1,
wherein in the first state, a first optical element is disposed between the optical system and the image sensor, and
wherein in the second state, a second optical element different from the first optical element is disposed between the optical system and the image sensor.

7. The lens apparatus according to claim 1, wherein the information about the optical element includes information by which a thickness of the optical element is identifiable.

8. The lens apparatus according to claim 1, wherein the information about the optical element includes information by which a refractive index of the optical element is identifiable.

9. The lens apparatus according to claim 1,
wherein the image capturing apparatus determines the loci according to the information about the optical element, and
wherein the lens control unit controls the position of the first focus lens unit and the position of the second focus lens unit based on the loci determined by the image capturing apparatus.

10. The lens apparatus according to claim 1, wherein the lens control unit determines the loci according to the information about the optical element.

11. The lens apparatus according to claim 1, wherein the lens apparatus includes a storage unit configured to store a plurality of pieces of information about the loci of the first focus lens unit and the second focus lens unit which differ from each other according to the information about the optical element.

12. An image capturing apparatus on and from which a lens apparatus that includes an optical system including a first focus lens unit and a second focus lens unit each being configured to move in loci different from each other in focusing is mountable and removable, the image capturing apparatus comprising:
an image sensor; and
a camera control unit configured to determine a target position of the first focus lens unit and a target position of the second focus lens unit based on the loci of the first focus lens unit and the second focus lens unit determined according to information about an optical element disposed between the optical system and the image sensor, wherein in a case where a configuration of the optical element between the optical system and the image sensor is in a first state, the lens control unit controls the position of the first focus lens unit and the position of the second focus lens unit such that the first focus lens unit and the second focus lens unit are arranged in a first arrangement to focus the optical system on a first subject distance, and wherein in a case where the configuration of the optical element between the optical system and the image sensor is in a second state different from the first state, the lens control unit controls the position of the first focus lens unit and the position of the second focus lens unit such that the first focus lens unit and the second focus lens unit are arranged in a second arrangement different from the first arrangement to focus the optical system on the first subject distance, wherein the following relationships are satisfied:

$$\left(\frac{S1}{|S1|}\right) \times \left(\frac{X1}{|X1|}\right) + \left(\frac{S2}{|S2|}\right) \times \left(\frac{X2}{|X2|}\right) = 0 \quad (1)$$

$S1 = (1-\beta i1^2) \times \beta i1r^2$, and $S2 = (1-\beta i2^2) \times \beta i2r^2$, where $\beta i1$ is a lateral magnification of the first focus lens unit in the first arrangement, $\beta i2$ is a lateral magnification of the second focus lens unit in the first arrangement, $\beta i1r$ is a combined lateral magnification of a lens unit disposed closer to an image side than the first focus lens unit in the first arrangement, $\beta i2r$ is a combined lateral magnification of a lens unit disposed closer to the image side than the second focus lens unit in the first arrangement, X1 is an amount of movement of the first focus lens unit changed from the first arrangement to the second arrangement, X2 is an amount of movement of the second focus lens unit changed from the first arrangement to the second arrangement.

13. A method of controlling a lens apparatus that includes an optical system including a first focus lens unit and a second focus lens unit each configured to move in loci different from each other in focusing and that is mountable on and removable from an image capturing apparatus including an image sensor, the method comprising:

determining a target position of the first focus lens unit and a target position of the second focus lens unit based on the loci of the first focus lens unit and the second focus lens unit determined according to information about an optical element disposed between the optical system and the image sensor; and controlling a position of the first focus lens unit and a position of the second focus lens unit based on the determined target positions, respectively, wherein in a case where a configuration of the optical element between the optical system and the image sensor is in a first state, the lens control unit controls the position of the first focus lens unit and the position of the second focus lens unit such that the first focus lens unit and the second focus lens unit are arranged in a first arrangement to focus the optical system on a first subject distance, and wherein in a case where the configuration of the optical element between the optical system and the image sensor is in a second state different from the first state, the lens control unit controls the position of the first focus lens unit and the position of the second focus lens unit such that the first focus lens unit and the second focus lens unit are arranged in a second arrangement different from the first arrangement to focus the optical system on the first subject distance, wherein the following relationships are satisfied:

$$\left(\frac{S1}{|S1|}\right) \times \left(\frac{X1}{|X1|}\right) + \left(\frac{S2}{|S2|}\right) \times \left(\frac{X2}{|X2|}\right) = 0 \quad (1)$$

$S1 = (1-\beta i1^2) \times \beta i1r^2$, and $S2 = (1-\beta i2^2) \times \beta i2r^2$, where $\beta i1$ is a lateral magnification of the first focus lens unit in the first arrangement, $\beta i2$ is a lateral magnification of the second focus lens unit in the first arrangement, $\beta i1r$ is a combined lateral magnification of a lens unit disposed closer to an image side than the first focus lens unit in the first arrangement, $\beta i2r$ is a combined lateral magnification of a lens unit disposed closer to the image side than the second focus lens unit in the first arrangement, X1 is an amount of movement of the first focus lens unit changed from the first arrangement to the second arrangement, X2 is an amount of movement of the second focus lens unit changed from the first arrangement to the second arrangement.

\* \* \* \* \*